US012588024B2

(12) United States Patent
Kim et al.

(10) Patent No.: US 12,588,024 B2
(45) Date of Patent: Mar. 24, 2026

(54) TIMELINES FOR TIME DIVISION MULTIPLEXING MODEM ENVELOPE ENHANCEMENTS

(71) Applicant: QUALCOMM Incorporated, San Diego, CA (US)

(72) Inventors: Hobin Kim, San Diego, CA (US); Jing Jiang, San Diego, CA (US); Hari Sankar, San Diego, CA (US); Kianoush Hosseini, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 18/333,410

(22) Filed: Jun. 12, 2023

(65) Prior Publication Data

US 2024/0414713 A1     Dec. 12, 2024

(51) Int. Cl.
| | |
|---|---|
| *H04W 72/1273* | (2023.01) |
| *H04B 7/0413* | (2017.01) |
| *H04L 1/1812* | (2023.01) |
| *H04L 5/14* | (2006.01) |
| *H04W 72/23* | (2023.01) |

(52) U.S. Cl.
CPC ...... *H04W 72/1273* (2013.01); *H04B 7/0413* (2013.01); *H04L 1/1812* (2013.01); *H04L 5/1469* (2013.01); *H04W 72/23* (2023.01)

(58) Field of Classification Search
CPC ............. H04W 72/1273; H04B 7/0413; H04L 1/1812; H04L 5/1469
See application file for complete search history.

(56) References Cited

U.S. PATENT DOCUMENTS

| | | | |
|---|---|---|---|
| 2018/0020335 A1* | 1/2018 | Yin ................... | H04W 28/0268 |
| 2018/0132258 A1* | 5/2018 | Andou ................. | H04L 5/0082 |
| 2021/0067281 A1* | 3/2021 | Sarkis .................. | H04L 1/1822 |
| 2022/0330234 A1* | 10/2022 | Yang .................... | H04L 5/0057 |

OTHER PUBLICATIONS

International Search Report and Written Opinion—PCT/US2024/033126—ISA/EPO—Sep. 6, 2024.

(Continued)

*Primary Examiner* — Mohammad S Anwar
(74) *Attorney, Agent, or Firm* — Holland & Hart LLP

(57) ABSTRACT
Methods, systems, and devices for wireless communications are described. Some examples of the described techniques provide for time-division multiplexing (TDM) modem envelope enhancements. A user equipment (UE) may receive, from a network entity, a message scheduling a transport block or multiple transport blocks in a downlink slot that immediately precedes one or more non-downlink slots (e.g., uplink (U), special(S), or flexible (F) slots) in a TDD slot configuration. The UE may receive the transport block or the multiple transport blocks in the downlink slot, and may process at least a portion of the transport block or the multiple transport blocks during one or more time intervals that occur after the downlink slot. The transport block may satisfy a per-slot transport block size threshold that is associated with a hybrid automatic repeat request (HARQ) processing timeline.

28 Claims, 18 Drawing Sheets

(56) References Cited

OTHER PUBLICATIONS

Kien L.T., et al., "Feedback Enhancements for Semi-Persistent Downlink Transmissions in Ultra-Reliable Low-Latency Communication", 2020 European Conference on Networks and Communications (EUCNC), IEEE, Jun. 15, 2020 (Jun. 15, 2020), pp. 286-290, DOI: 10.1109/EUCNC48522.2020.9200972 [retrieved on Sep. 18, 2020] sections II, III.

Samsung: "Discussion on frame structure and HARQ timing", 3GPP TSG RAN WG1 #86, R1-166757, Aug. 22-26, 2016, 3rd Generation Partnership Project, Mobile Competence Centre, 650, Route Des Lucioles, F-06921 Sophia-Antipolis Cedex, France, vol. RAN WG1, No. Gothenburg, Sweden, XP051141921, pp. 1-4, section 2.

* cited by examiner

400

115-b 105-b

505    Scheduling

510    Transport block(s) in downlink slot

515    Process a portion of the transport blocks

Uplink signaling

520

500

600

130　　　105　　　　　115

Network Entity

Transceiver

1410

Antenna

1415

Communications Manager

1420

Memory

Code

1430

1425

1440

Processor

1435

1405

1400

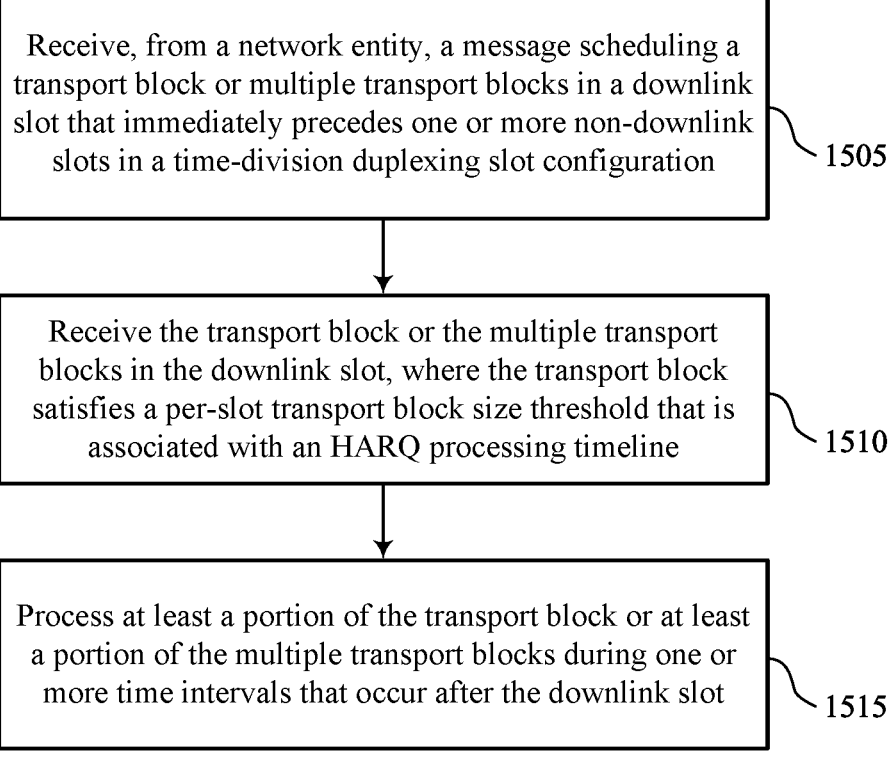

Receive, from a network entity, a message scheduling a transport block or multiple transport blocks in a downlink slot that immediately precedes one or more non-downlink slots in a time-division duplexing slot configuration        1505

Receive the transport block or the multiple transport blocks in the downlink slot, where the transport block satisfies a per-slot transport block size threshold that is associated with an HARQ processing timeline        1510

Process at least a portion of the transport block or at least a portion of the multiple transport blocks during one or more time intervals that occur after the downlink slot        1515

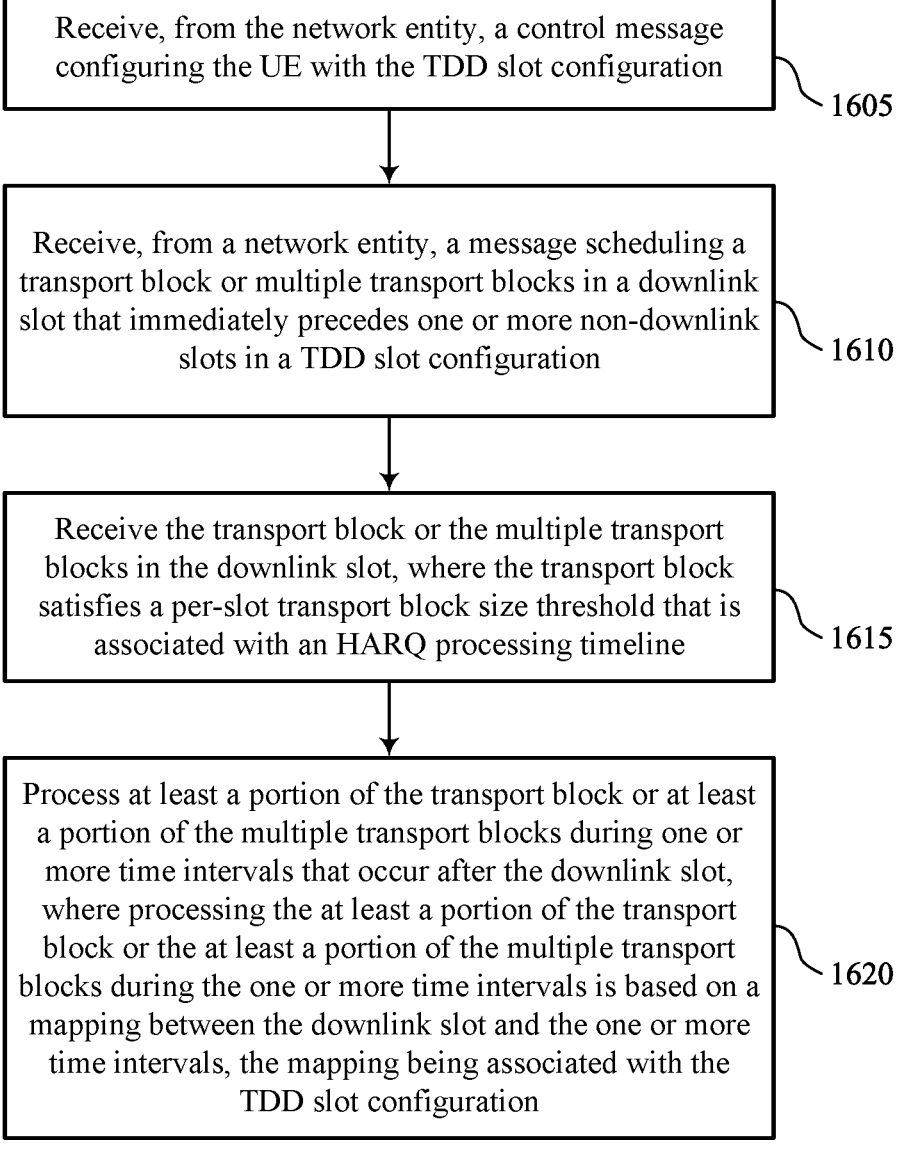

Receive, from the network entity, a control message configuring the UE with the TDD slot configuration
1605

Receive, from a network entity, a message scheduling a transport block or multiple transport blocks in a downlink slot that immediately precedes one or more non-downlink slots in a TDD slot configuration
1610

Receive the transport block or the multiple transport blocks in the downlink slot, where the transport block satisfies a per-slot transport block size threshold that is associated with an HARQ processing timeline
1615

Process at least a portion of the transport block or at least a portion of the multiple transport blocks during one or more time intervals that occur after the downlink slot, where processing the at least a portion of the transport block or the at least a portion of the multiple transport blocks during the one or more time intervals is based on a mapping between the downlink slot and the one or more time intervals, the mapping being associated with the TDD slot configuration
1620

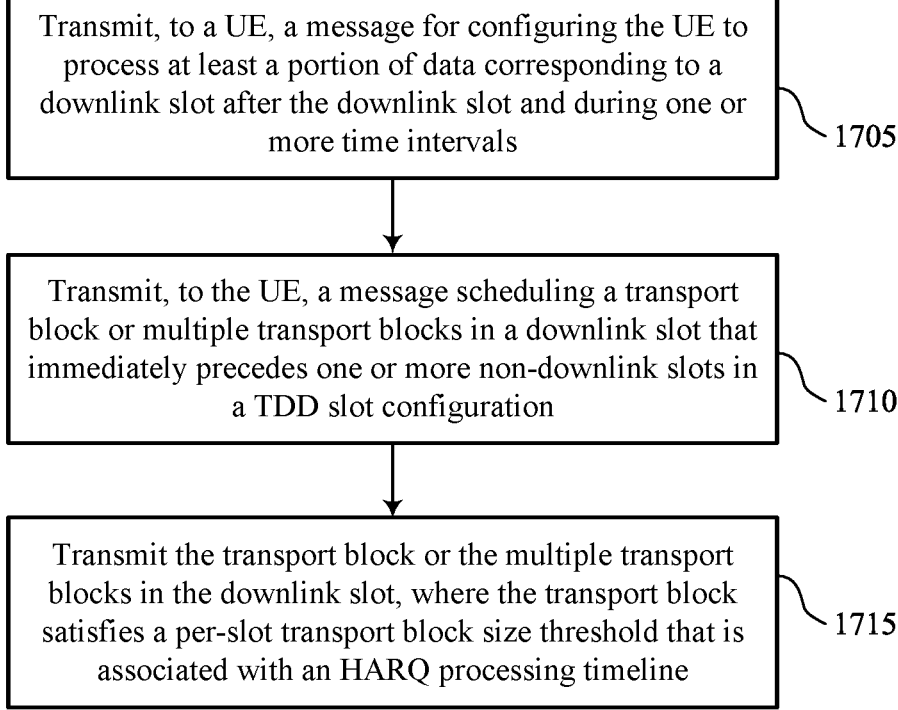

Transmit, to a UE, a message for configuring the UE to process at least a portion of data corresponding to a downlink slot after the downlink slot and during one or more time intervals

1705

Transmit, to the UE, a message scheduling a transport block or multiple transport blocks in a downlink slot that immediately precedes one or more non-downlink slots in a TDD slot configuration

1710

Transmit the transport block or the multiple transport blocks in the downlink slot, where the transport block satisfies a per-slot transport block size threshold that is associated with an HARQ processing timeline

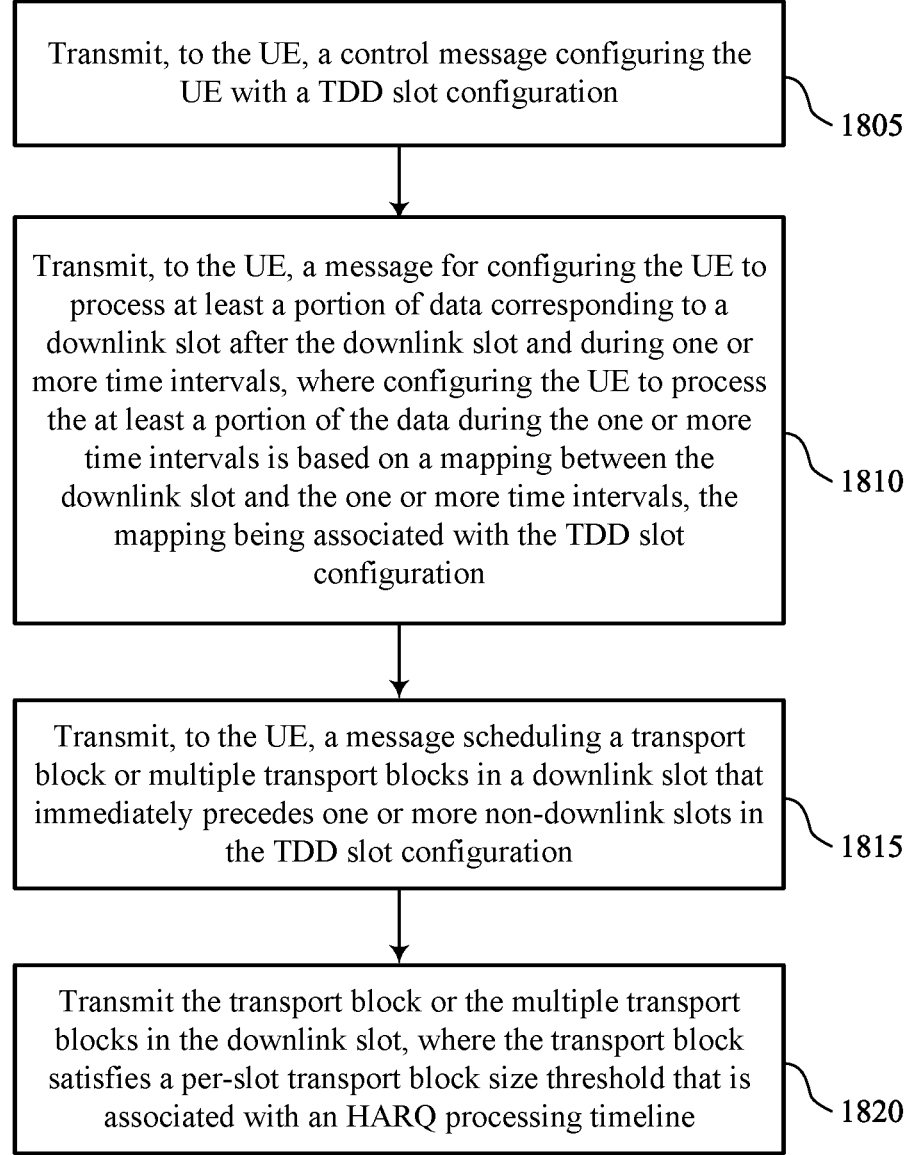

Transmit, to the UE, a control message configuring the UE with a TDD slot configuration

1805

Transmit, to the UE, a message for configuring the UE to process at least a portion of data corresponding to a downlink slot after the downlink slot and during one or more time intervals, where configuring the UE to process the at least a portion of the data during the one or more time intervals is based on a mapping between the downlink slot and the one or more time intervals, the mapping being associated with the TDD slot configuration

1810

Transmit, to the UE, a message scheduling a transport block or multiple transport blocks in a downlink slot that immediately precedes one or more non-downlink slots in the TDD slot configuration

1815

Transmit the transport block or the multiple transport blocks in the downlink slot, where the transport block satisfies a per-slot transport block size threshold that is associated with an HARQ processing timeline

TIMELINES FOR TIME DIVISION MULTIPLEXING MODEM ENVELOPE ENHANCEMENTS

FIELD OF TECHNOLOGY

The following relates to wireless communications, including timelines for time division multiplexing (TDM) modem envelope enhancements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). A UE and a base station may accordingly communicate signals between each other. A signal sent from a base station to the UE may be referred to as a downlink signal, and a signal sent from the UE to the base station may be referred to as an uplink signal.

SUMMARY

The described techniques relate to improved methods, systems, devices, and apparatuses that support timelines for time division multiplexing (TDM) modem envelope enhancements. Some wireless communication systems include network entities and user equipments (UEs) with modem processing capacities designed to process at a peak rate (e.g., maximum processing power per slot). For time-division duplexing (TDD) communications by a UE, a modem may process downlink and uplink signals using time-division multiplexing (TDM). After processing a downlink signal in a downlink slot (e.g., during an uplink slot), the modem may not perform downlink processing (e.g., demodulation or decoding). In many cases, modem processing throughput may be limited by baseband processing power.

Some examples of the described techniques provide for TDM modem envelope enhancements. For example, a UE may receive, from a network entity, a message scheduling multiple transport blocks in a downlink slot that immediately precedes one or more non-downlink slots (e.g., uplink (U), special(S), or flexible (F) slots) in a TDD slot configuration. The UE may receive the multiple transport blocks in the downlink slot, and may process at least a portion of the multiple transport blocks during one or more time intervals that occur after the downlink slot. For example, one or more transport blocks received during a downlink slot may be processed by a UE modem in one or more time intervals during U, S, or F slot processing. To keep a relatively regular modem processing pipeline and a relatively unified hybrid automatic repeat request (HARQ) processing timeline, these transport blocks may be considered as being scheduled in a time interval (e.g., in a virtual time interval, which may be referred to as a "virtual slot" or some similar terminology) after the downlink slot. For example, a time interval may be utilized when a transport block is actually or physically scheduled in a downlink slot. Though the transport block is actually or physically scheduled in a downlink slot, to facilitate a processing timeline, transport block processing may be scheduled in a later slot (e.g., in a U, S, or F slot when there is no downlink processing expected for the given TDD configuration). When multiple transport blocks are allocated to the same downlink slot and some of the transport blocks are designated for processing in a later time interval (e.g., during a U, S, or F slot), where no downlink data processing is actually scheduled in that time interval, the UE may be scheduled with more data than the UE's instantaneous processing capacity, and the UE may achieve an effectively higher data throughput (e.g., higher data rate) than the UE's current processing capacity may support.

A method for wireless communications at a UE is described. The method may include receiving, from a network entity, a message scheduling a transport block or multiple transport blocks in a downlink slot that immediately precedes one or more non-downlink slots in a TDD slot configuration, receiving the transport block or the multiple transport blocks in the downlink slot, where the transport block satisfies a per-slot transport block size threshold that is associated with a HARQ processing timeline, and processing at least a portion of the transport block or at least a portion of the multiple transport blocks during one or more time intervals that occur after the downlink slot.

A UE for wireless communications is described. The UE may include one or more memories storing processor-executable code, and one or more processors coupled with the one or more memories and individually or collectively operable to execute the code to cause the UE to receive, from a network entity, a message scheduling a transport block or multiple transport blocks in a downlink slot that immediately precedes one or more non-downlink slots in a TDD slot configuration, receive the transport block or the multiple transport blocks in the downlink slot, where the transport block satisfies a per-slot transport block size threshold that is associated with an HARQ processing timeline, and process at least a portion of the transport block or at least a portion of the multiple transport blocks during one or more time intervals that occur after the downlink slot.

Another UE for wireless communications is described. The UE may include means for receiving, from a network entity, a message scheduling a transport block or multiple transport blocks in a downlink slot that immediately precedes one or more non-downlink slots in a TDD slot configuration, means for receiving the transport block or the multiple transport blocks in the downlink slot, where the transport block satisfies a per-slot transport block size threshold that is associated with an HARQ processing timeline, and means for processing at least a portion of the transport block or at least a portion of the multiple transport blocks during one or more time intervals that occur after the downlink slot.

A non-transitory computer-readable medium storing code for wireless communications is described. The code may include instructions executable by one or more processors to receive, from a network entity, a message scheduling a transport block or multiple transport blocks in a downlink slot that immediately precedes one or more non-downlink slots in a TDD slot configuration, receive the transport block or the multiple transport blocks in the downlink slot, where the transport block satisfies a per-slot transport block size threshold that is associated with an HARQ processing timeline, and process at least a portion of the transport block or at least a portion of the multiple transport blocks during one or more time intervals that occur after the downlink slot.

Some examples of the method, UEs, and non-transitory computer-readable medium described herein may further include operations, features, means, or instructions for receiving, from the network entity, a control message configuring the UE with the TDD slot configuration, where processing the at least a portion of the transport block or the at least a portion of the multiple transport blocks during the one or more time intervals may be based on a mapping between the downlink slot and the one or more time intervals, the mapping being associated with the TDD slot configuration.

Some examples of the method, UEs, and non-transitory computer-readable medium described herein may further include operations, features, means, or instructions for receiving, from the network entity, information indicating the one or more time intervals for processing the at least a portion of the transport block or the at least a portion of the multiple transport blocks.

In some examples of the method, UEs, and non-transitory computer-readable medium described herein, the information may be received via a downlink control information (DCI) message, a radio resource control (RRC) message, a medium access control control element (MAC-CE), or a combination thereof.

Some examples of the method, UEs, and non-transitory computer-readable medium described herein may further include operations, features, means, or instructions for determining that the processing of the at least a portion of the transport block or the at least a portion of the multiple transport blocks during the one or more time intervals may be allowed for the downlink slot based on the one or more non-downlink slots including flexible slots.

Some examples of the method, UEs, and non-transitory computer-readable medium described herein may further include operations, features, means, or instructions for receiving a control message including an indication of one or more slots for which the processing of the at least a portion of the transport block or the at least a portion of the multiple transport blocks during the one or more time intervals may be allowed based on the one or more non-downlink slots including the flexible slots, where determining that the processing of the at least the portion of the multiple transport blocks during the one or more time intervals may be allowed for the downlink slot may be in accordance with the indication.

In some examples of the method, UEs, and non-transitory computer-readable medium described herein, the control message includes a DCI message or an RRC message.

Some examples of the method, UEs, and non-transitory computer-readable medium described herein may further include operations, features, means, or instructions for transmitting a capability message indicating a capability of the UE to process the at least a portion of the transport block or the at least a portion of the multiple transport blocks during the one or more time intervals, where the processing may be based on the capability of the UE.

Some examples of the method, UEs, and non-transitory computer-readable medium described herein may further include operations, features, means, or instructions for determining that a quantity of the multiple transport blocks satisfies a threshold, where processing the at least a portion of the multiple transport blocks may be based on a timeline that may be extended in response to the quantity of the multiple transport blocks satisfying the threshold.

Some examples of the method, UEs, and non-transitory computer-readable medium described herein may further include operations, features, means, or instructions for determining that a size of the transport block satisfies the threshold, where processing the at least the portion of the transport block may be based on a timeline that may be extended in response to the size of the transport block satisfying the threshold.

Some examples of the method, UEs, and non-transitory computer-readable medium described herein may further include operations, features, means, or instructions for determining that a processed quantity of the multiple transport blocks satisfies a processing threshold and dropping at least one of the multiple transport blocks in response to the processed quantity of the multiple transport blocks satisfying the processing threshold.

Some examples of the method, UEs, and non-transitory computer-readable medium described herein may further include operations, features, means, or instructions for receiving downlink data between the downlink slot and the one or more time intervals and sending an asynchronous HARQ message in response to the downlink data.

In some examples of the method, UEs, and non-transitory computer-readable medium described herein, receiving the multiple transport blocks may include operations, features, means, or instructions for receiving the multiple transport blocks in the downlink slot as part of a multiple-input multiple-output (MIMO) transmission, where processing the at least a portion of the multiple transport blocks during the one or more time intervals may be based on the MIMO transmission in the downlink slot having a greater quantity of layers than a second MIMO transmission in a second downlink slot before the downlink slot.

In some examples of the method, UEs, and non-transitory computer-readable medium described herein, receiving the transport block may include operations, features, means, or instructions for receiving the transport block in the downlink slot as part of a MIMO transmission, where processing the at least a portion of the transport block during the one or more time intervals may be based on a size of the transport block for a quantity of layers of the MIMO transmission exceeding a capability of the UE associated with the HARQ processing timeline.

In some examples of the method, UEs, and non-transitory computer-readable medium described herein, receiving the multiple transport blocks may include operations, features, means, or instructions for receiving the multiple transport blocks in the downlink slot as part of a carrier aggregation (CA) transmission, a multiple transmission and reception point (mTRP) transmission, an ultra-reliable and low-latency communications (URLLC) transmission, or a combination thereof, where processing the at least a portion of the multiple transport blocks during the one or more time intervals may be based on the CA transmission, the mTRP transmission, the URLLC transmission, or a combination thereof.

In some examples of the method, UEs, and non-transitory computer-readable medium described herein, receiving the multiple transport blocks in the downlink slot may include operations, features, means, or instructions for receiving the multiple transport blocks in the downlink slot as part of a code block group (CBG)-based HARQ retransmission, where processing the at least a portion of the multiple transport blocks during the one or more time intervals may be based on the CBG-based HARQ retransmission.

In some examples of the method, UEs, and non-transitory computer-readable medium described herein, the one or more time intervals at least partially overlap in a time domain with the one or more non-downlink slots.

In some examples of the method, UEs, and non-transitory computer-readable medium described herein, the one or more non-downlink slots include one or more uplink slots, special slots, flexible slots, or a combination thereof.

In some examples of the method, UEs, and non-transitory computer-readable medium described herein, processing the at least a portion of the multiple transport blocks may include operations, features, means, or instructions for processing the at least a portion of the multiple transport blocks in an order based on an index of the multiple transport blocks in the downlink slot immediately preceding the one or more non-downlink slots.

In some examples of the method, UEs, and non-transitory computer-readable medium described herein, the one or more time intervals correspond to one or more sub-slots of the non-downlink slots.

A method for wireless communications at a network entity is described. The method may include transmitting, to a UE, a message for configuring the UE to process at least a portion of data corresponding to a downlink slot after the downlink slot and during one or more time intervals, transmitting, to the UE, a message scheduling a transport block or multiple transport blocks in a downlink slot that immediately precedes one or more non-downlink slots in a time division-duplexing slot configuration, and transmitting the transport block or the multiple transport blocks in the downlink slot, where the transport block satisfies a per-slot transport block size threshold that is associated with an HARQ processing timeline.

A network entity for wireless communications is described. The network entity may include one or more memories storing processor-executable code, and one or more processors coupled with the one or more memories and individually or collectively operable to execute the code to cause the network entity to transmit, to a UE, a message for configuring the UE to process at least a portion of data corresponding to a downlink slot after the downlink slot and during one or more time intervals, transmit, to the UE, a message scheduling a transport block or multiple transport blocks in a downlink slot that immediately precedes one or more non-downlink slots in a TDD slot configuration, and transmit the transport block or the multiple transport blocks in the downlink slot, where the transport block satisfies a per-slot transport block size threshold that is associated with an HARQ processing timeline.

Another network entity for wireless communications is described. The network entity may include means for transmitting, to a UE, a message for configuring the UE to process at least a portion of data corresponding to a downlink slot after the downlink slot and during one or more time intervals, means for transmitting, to the UE, a message scheduling a transport block or multiple transport blocks in a downlink slot that immediately precedes one or more non-downlink slots in a time division-duplexing slot configuration, and means for transmitting the transport block or the multiple transport blocks in the downlink slot, where the transport block satisfies a per-slot transport block size threshold that is associated with an HARQ processing timeline.

A non-transitory computer-readable medium storing code for wireless communications is described. The code may include instructions executable by one or more processors to transmit, to a UE, a message for configuring the UE to process at least a portion of data corresponding to a downlink slot after the downlink slot and during one or more time intervals, transmit, to the UE, a message scheduling a transport block or multiple transport blocks in a downlink slot that immediately precedes one or more non-downlink slots in a time division-duplexing slot configuration, and transmit the transport block or the multiple transport blocks in the downlink slot, where the transport block satisfies a per-slot transport block size threshold that is associated with an HARQ processing timeline.

Some examples of the method, network entities, and non-transitory computer-readable medium described herein may further include operations, features, means, or instructions for transmitting, to the UE, a control message configuring the UE with a TDD slot configuration, where configuring the UE to process the at least a portion of the data during the one or more time intervals may be based on a mapping between the downlink slot and the one or more time intervals, the mapping being associated with the TDD slot configuration.

Some examples of the method, network entities, and non-transitory computer-readable medium described herein may further include operations, features, means, or instructions for transmitting, to the UE, information indicating the one or more time intervals for processing the at least a portion of the transport block or the at least a portion of the multiple transport blocks.

In some examples of the method, network entities, and non-transitory computer-readable medium described herein, the information may be transmitted via a DCI message, an RRC message, a MAC-CE, or a combination thereof.

Some examples of the method, network entities, and non-transitory computer-readable medium described herein may further include operations, features, means, or instructions for determining that the processing of the at least a portion of the transport block or the at least a portion of the multiple transport blocks during the one or more time intervals may be allowed for the downlink slot based on the one or more non-downlink slots including flexible slots.

Some examples of the method, network entities, and non-transitory computer-readable medium described herein may further include operations, features, means, or instructions for transmitting a control message including an indication of one or more slots for which the processing of the at least a portion of the transport block or the at least a portion of the multiple transport blocks during the one or more time intervals may be allowed based on the one or more non-downlink slots including the flexible slots, where determining that the processing of the at least the portion of the multiple transport blocks during the one or more time intervals may be allowed for the downlink slot may be in accordance with the indication.

In some examples of the method, network entities, and non-transitory computer-readable medium described herein, the control message includes a DCI message or an RRC message.

Some examples of the method, network entities, and non-transitory computer-readable medium described herein may further include operations, features, means, or instructions for receiving a capability message indicating a capability of the UE to process the at least a portion of the transport block or the at least a portion of the multiple transport blocks during the one or more time intervals, where configuring the UE may be based on the capability of the UE.

Some examples of the method, network entities, and non-transitory computer-readable medium described herein may further include operations, features, means, or instructions for determining that a quantity of the multiple transport blocks satisfies a threshold, where configuring the UE to process the at least a portion of the multiple transport blocks may be based on a timeline that may be extended in response to the quantity of the multiple transport blocks satisfying the threshold.

Some examples of the method, network entities, and non-transitory computer-readable medium described herein may further include operations, features, means, or instructions for determining that a size of the transport block satisfies the threshold, where configuring the UE to process the at least the portion of the transport block may be based on a timeline that may be extended in response to the size of the transport block satisfying the threshold.

Some examples of the method, network entities, and non-transitory computer-readable medium described herein may further include operations, features, means, or instructions for transmitting downlink data between the downlink slot and the one or more time intervals and receiving an asynchronous HARQ message in response to the downlink data.

In some examples of the method, network entities, and non-transitory computer-readable medium described herein, transmitting the multiple transport blocks may include operations, features, means, or instructions for transmitting the multiple transport blocks in the downlink slot as part of a MIMO transmission, where the MIMO transmission in the downlink slot may have a greater quantity of layers than a second MIMO transmission in a second downlink slot before the downlink slot.

In some examples of the method, network entities, and non-transitory computer-readable medium described herein, transmitting the transport block may include operations, features, means, or instructions for transmitting the transport block in the downlink slot as part of a MIMO transmission, where a size of the transport block for a quantity of layers of the MIMO transmission exceeds a capability of the UE associated with the HARQ processing timeline.

In some examples of the method, network entities, and non-transitory computer-readable medium described herein, transmitting the multiple transport blocks may include operations, features, means, or instructions for transmitting the multiple transport blocks in the downlink slot as part of a carrier aggregation (CA) transmission, a multiple transmission and reception point (mTRP) transmission, an ultra-reliable and low-latency communications (URLLC) transmission, or a combination thereof.

In some examples of the method, network entities, and non-transitory computer-readable medium described herein, transmitting the multiple transport blocks in the downlink slot may include operations, features, means, or instructions for transmitting the multiple transport blocks in the downlink slot as part of a code block group (CBG)-based HARQ retransmission.

In some examples of the method, network entities, and non-transitory computer-readable medium described herein, the one or more time intervals at least partially overlap in a time domain with the one or more non-downlink slots.

In some examples of the method, network entities, and non-transitory computer-readable medium described herein, the one or more non-downlink slots include one or more uplink slots, special slots, flexible slots, or a combination thereof.

In some examples of the method, network entities, and non-transitory computer-readable medium described herein, the one or more time intervals correspond to one or more sub-slots of the non-downlink slots.

BRIEF DESCRIPTION OF THE DRAWINGS

FIGS. 15 through 18 show flowcharts illustrating methods that support timelines for TDM modem envelope enhancements in accordance with one or more aspects of the present disclosure.

DETAILED DESCRIPTION

Figure 1:
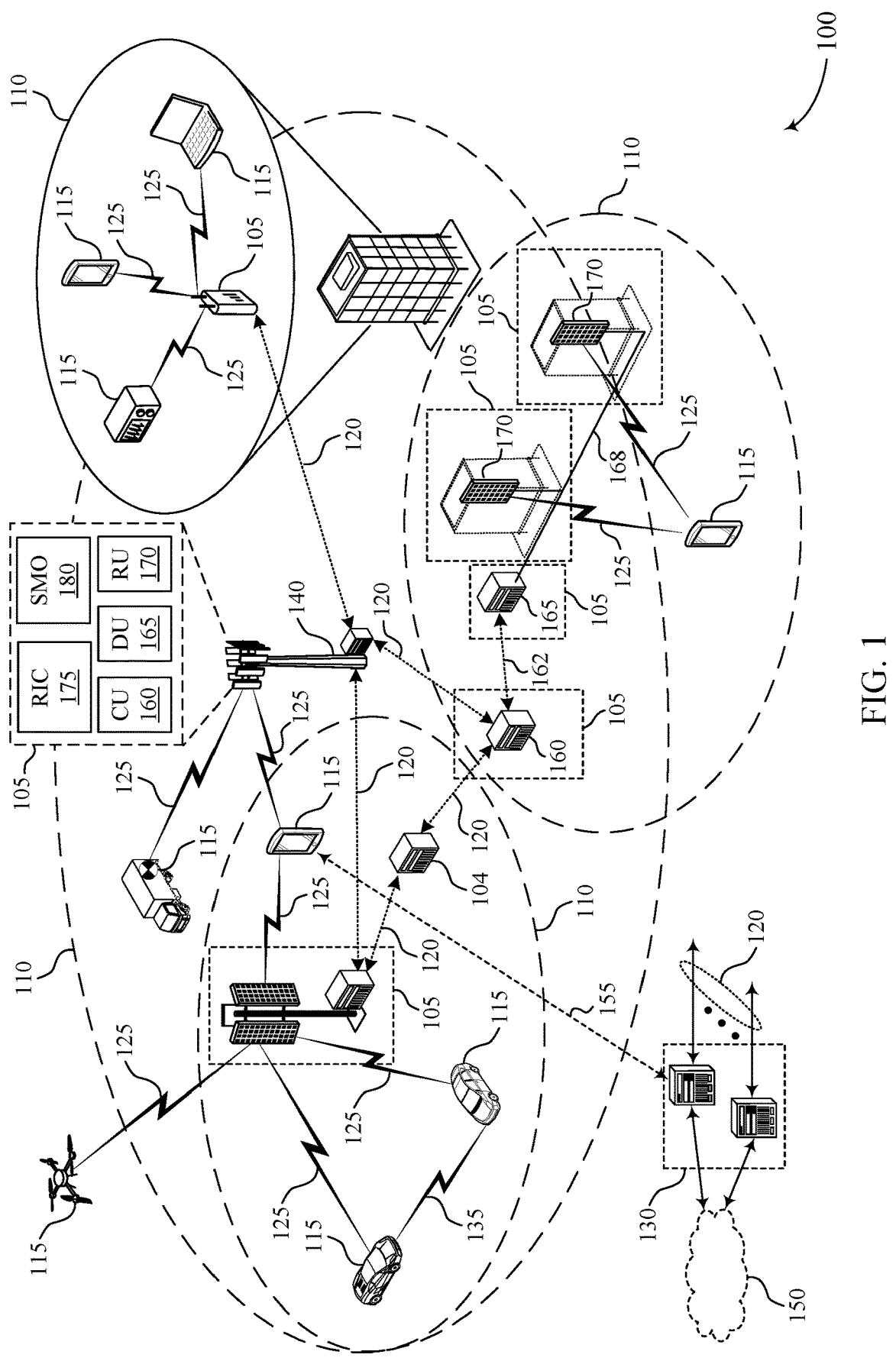
FIG. 1 shows an example of a wireless communications system that supports timelines for time division multiplexing (TDM) modem envelope enhancements in accordance with one or more aspects of the present disclosure.

Some wireless communication systems include network entities and user equipments (UEs) with modem processing capacities designed to process at a peak rate (e.g., maximum processing power per slot). In a time-division duplexing (TDD) configuration for communications by a UE, a modem may process downlink and uplink signals using time-division multiplexing (TDM). After processing a downlink signal in a downlink slot, during an uplink slot, the modem may not perform downlink processing (e.g., demodulation or decoding). In many cases, modem processing throughput may be limited by baseband processing power. For example, modem processing capacity may support significantly higher throughput for two-layer multiple-input and multiple-output (MIMO) than for four-layer MIMO. In another example, if a UE is configured to support eight-layer MIMO, then the UE may support a relatively smaller aggregated bandwidth. When multiple transport blocks are scheduled in a last downlink slot (or a last quantity of downlink slots in one TDD downlink/uplink period as part of a MIMO transmission, carrier aggregation (CA) transmission, ultra-reliable and low-latency communications (URLLC) transmission, or multi-transport block transmission in the same slot), the transport blocks may be scheduled in one slot, but may not be processed in the last downlink slot. In any case, the idling modem processing capacity during an uplink slot (or other non-downlink slots) may not be utilized, as the UE may generate feedback to meet a hybrid automatic repeat request (HARQ) timeline. The UE may not process more transport blocks per slot than the UE capacity. Enhancements may be desired to increase UE processing and throughput. Some examples of the techniques described herein may provide an air interface to increase modem processing power utilization (e.g., to cater modem envelope scaling across different UE capabilities).

A UE may receive, from a network entity, a message scheduling multiple transport blocks in a downlink slot that immediately precedes one or more non-downlink slots (e.g., uplink (U), special(S), or flexible (F) slots in a TDD slot configuration. The UE may receive the multiple transport blocks in the downlink slot, and may process at least a portion of the multiple transport blocks during one or more time intervals that occur after the downlink slot. For example, one or more transport blocks received during a downlink slot may be processed by a UE modem in one or more time intervals during U, S, or F slot processing. To enable a more regular modem processing pipeline and a more unified HARQ processing timeline, these transport blocks may be considered as being scheduled in a time interval (e.g., in a "virtual slot") that is after the downlink slot. For example, a time interval for processing one or more transport blocks may be utilized when the one or more transport blocks are actually or physically scheduled in a downlink slot (e.g., a last downlink slot). Though the one or more transport blocks are actually or physically scheduled in the downlink slot, to facilitate a processing timeline, transport block processing may be scheduled in a later (e.g., "virtual") slot (e.g., in a U, S, or F slot when there is no downlink processing expected for the given TDD configuration). When multiple transport blocks are allocated to the same downlink slot and some of the transport blocks are designated for processing in a later time interval (e.g., during a U, S, or F slot), where no downlink data processing is actually scheduled in that time interval, the UE may be scheduled with more data than the UE's instantaneous processing capacity, and the UE may achieve an effectively higher data throughput (e.g., higher data rate) than the UE's current processing capacity (e.g., "envelope") may support.

Particular aspects of the subject matter described in this disclosure can be implemented to realize one or more of the following potential advantages. Performing downlink processing in a later time interval may increase resource utilization efficiency by utilizing modem downlink processing resources when the processing resources would otherwise be idling. This may allow reception of a quantity of data (e.g., transport blocks), during a downlink slot, that exceeds modem downlink processing resources during the downlink slot, but that may be processed after the downlink slot, thereby allowing increased utilization of the transmission medium.

Aspects of the disclosure are initially described in the context of wireless communications systems. Aspects of downlink transport block processing in one or more time intervals during one or more non-downlink slots are described. Aspects of the disclosure are further illustrated by and described with reference to apparatus diagrams, system diagrams, and flowcharts that relate to timelines for TDM modem envelope enhancements.

FIG. 1 shows an example of a wireless communications system 100 that supports timelines for TDM modem envelope enhancements in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support timelines for TDM modem envelope enhancements as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communication system 100 may support techniques and timelines for TDM modem envelope enhancements. A UE 115 may receive, from a network entity 105, a message scheduling multiple transport blocks in a downlink slot that immediately precedes one or more non-downlink slots (e.g., U, S, or F slots) in a TDD slot configuration. The UE 115 may receive, from the network entity 105, the multiple transport blocks in the downlink slot, and may process at least a portion of the multiple transport blocks during one or more time intervals that occur after the downlink slot. For example, one or more transport blocks received during a downlink slot may be processed by a UE modem in one or more time intervals during U, S, or F slot processing. To achieve a more regular modem processing pipeline and a more unified HARQ processing timeline, such transport blocks may be handled as being scheduled in a time interval (e.g., in a "virtual time interval," in a "virtual slot") that occurs after the downlink slot. For example, a time interval may be utilized when a transport block is actually or physically scheduled in a downlink slot. Though the transport block is actually or physically scheduled in a downlink slot, to facilitate a processing timeline, transport block processing may be scheduled in a later slot (e.g., in a U, S, or F slot when there is no downlink processing expected for the given TDD configuration). When multiple transport blocks are allocated to the same downlink slot and some of the transport blocks are designated for processing in a later time interval (e.g., during a U, S, or F slot), where no downlink data processing is actually scheduled in that time interval, the UE 115 may be scheduled with more data than the instantaneous processing capacity of the UE 115, and the UE 115 may achieve an effectively higher data throughput (e.g., higher data rate) than the current processing capacity (e.g., "envelope") of the UE 115 may support.

Figure 2:
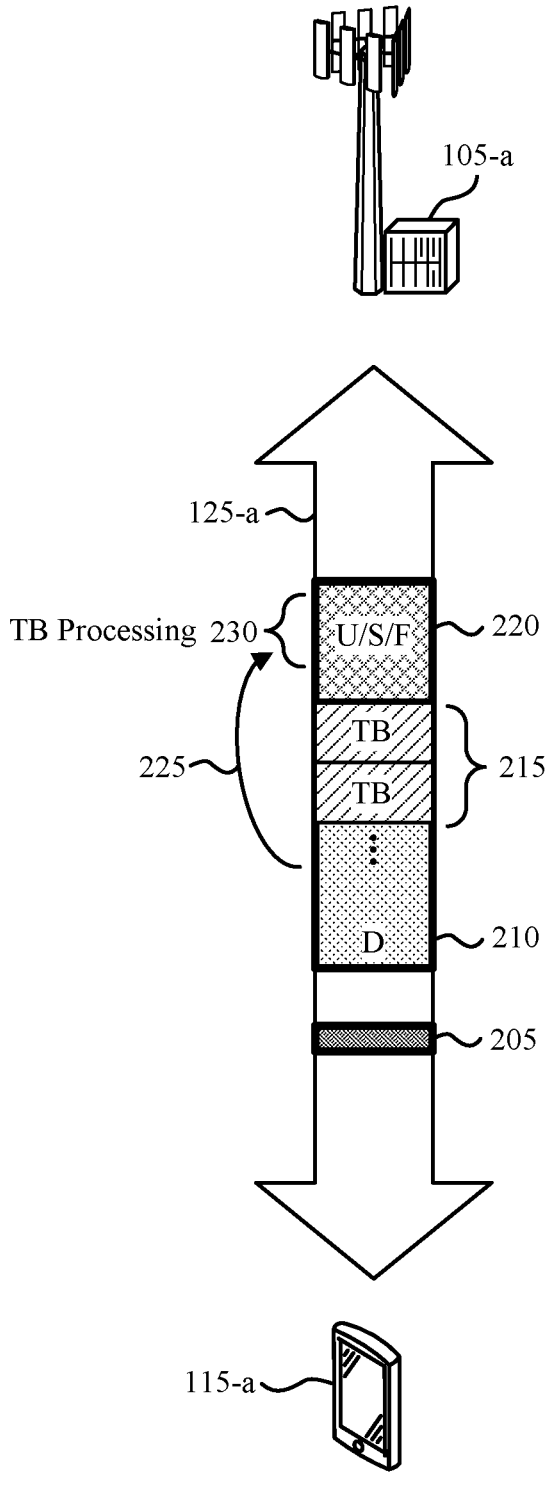
FIG. 2 shows an example of a wireless communication system that supports timelines for TDM modem envelope enhancements in accordance with one or more aspects of the present disclosure.

FIG. 2 shows an example of a wireless communication system 200 that supports timelines for TDM modem envelope enhancements in accordance with one or more aspects of the present disclosure. The wireless communications system 200 may implement aspects of or may be implemented by aspects of the wireless communications system 100. For example, the wireless communications system 200 includes a UE 115-a, which may be an example of a UE 115 described with respect to FIG. 1. The wireless communications system 200 also includes a network entity 105-a, which may be an example of a network entity 105 as described with respect to FIG. 1.

The UE 115-a may communicate with the network entity 105-a using a communication link 125-a, which may be an example of the communication links 125 described with respect to FIG. 1. The communication link 125-a may include a bi-directional link that enable both uplink and downlink communications. For example, the UE 115-a may transmit uplink signals (e.g., uplink transmissions), such as uplink control signals or uplink data signals, to the network entity 105-*a* using the communication link 125-*a*, and the network entity 105-*a* may transmit downlink signals (e.g., downlink transmissions), such as downlink control signals or downlink data signals, to the UE 115-*a* using the communication link 125-*a*. In some examples, the communication link 125-*a* may be an example of an NR or LTE link between the UE 115-*a* and the network entity 105-*a*.

Wireless communication system 200 may include various devices (e.g., the network entity 105-*a*, the UE 115-*a*) with modem processing capacities designed to process at a peak rate (e.g., maximum processing power per slot). In a TDD configuration used by the UE 115-*a* for wireless communications, a modem of the UE 115-*a* may process downlink and uplink signals using TDM. After processing a downlink signal in a downlink slot, during an uplink slot (or other non-downlink slot), the modem of the UE 115-*a* may not perform downlink processing (e.g., demodulation or decoding). In many cases, modem processing throughput may be limited by baseband processing power. For example, modem processing capacity may support significantly higher throughput for two-layer MIMO than for four-layer MIMO. In another example, if the UE 115-*a* is configured to support eight-layer MIMO, then the UE 115-*a* may support a relatively smaller aggregated bandwidth. As illustrated in Table 1, the total BW that can be supported increases when the quantity of MIMO layers supported decreases. Bandwidths are provided in units of megahertz (MHz).

TABLE 1

| Target | 8-layer MIMO BW envelope (MHz) | 6-layer MIMO BW envelope (MHz) | 4-layer MIMO BW envelope (MHz) | 2-layer MIMO BW envelope (MHz) |
|---|---|---|---|---|
| UE Modem | <<200 | <<300 | <<500 | 1000 |

When multiple transport blocks are scheduled in a last downlink slot (or a last quantity of downlink slots in one TDD downlink/uplink period as part of a MIMO transmission, CA transmission, URLLC transmission, or multi-transport block transmission in the same slot), the transport blocks may be scheduled in one slot, but may not be processed in the last downlink slot. Here, a "last downlink slot" may refer a last downlink slot in a sequence of slots, which may be followed by one or more other slots, such as described with reference to the examples of FIGS. 3 and 4. In any case, the idling modem processing capacity during an uplink slot (or other non-downlink slots) may not be utilized, as the UE 115-*a* may generate feedback to meet a HARQ processing timeline. The UE 115-*a* may not process more transport blocks per slot than the capacity of the UE 115-*a*. Enhancements may be desired to increase UE processing and throughput. Some examples of the techniques described herein may provide an air interface to increase modem processing power utilization (e.g., to enable modem envelope scaling across different UE capabilities).

The UE 115-*a* receive, from a network entity 105-*a*, a message 205 scheduling multiple transport blocks 215 in a downlink slot 210 that immediately precedes one or more non-downlink slots 220 in a TDD slot configuration. For example, the message 205 may be a downlink control information (DCI) message (for dynamic scheduling, for instance), an RRC message (for semi-persistent scheduling, for instance), or a media access control-control element (MAC-CE) message. The message 205 may indicate resources utilized to carry the transport blocks 215 in the downlink slot 210. In some cases, a quantity of scheduled transport blocks 215 may be greater than a quantity of transport blocks that the UE may process within the downlink slot 210.

The TDD slot configuration may indicate one or more time slots in a frame structure as one or more downlink slots, one or more uplink slots, one or more special slots, one or more flexible slots, or a combination thereof. A downlink slot may be a time period in which the network entity 105-*a* may transmit downlink data (e.g., transport blocks 215), which the UE 115-*a* may receive. An uplink slot may be a time period in which in the UE 115-*a* may transmit uplink data to the network entity 105-*a*. A special slot may be a time period that includes an uplink portion (e.g., uplink symbols) for communicating uplink data, a downlink portion (e.g., downlink symbols) for communicating downlink data, and a guard period between the uplink portion and the downlink portion. A flexible slot may be a time period that can be utilized (e.g., configured or assigned) for uplink communication or downlink communication.

As used herein, the term "non-downlink slot" may refer to an uplink slot, a special slot, or a flexible slot. For example, the one or more non-downlink slots 220 may include one more uplink slots, one or more special slots, one or more flexible slots, or a combination thereof. The downlink slot 210 may immediately precede the one or more non-downlink slots 220 in the TDD slot configuration. For example, the one or more non-downlink slots 220 may be arranged immediately after the downlink slot 210 without an intervening slot in the TDD slot configuration.

The UE 115-*a* may receive the multiple transport blocks 215 in the downlink slot 210. For example, the UE 115-*a* may receive the multiple transport blocks 215 during the downlink slot 210 using a receiver (e.g., antenna(s), power amplifier(s)). The UE 115-*a* may store the transport blocks 215 in memory (e.g., in a modem buffer).

The UE 115-*a* may process at least a portion of the multiple transport blocks 215 during one or more time intervals 230 that occur after the downlink slot 210. For example, the processing may include demodulating or decoding at least a portion of the transport blocks 215 during the one or more time intervals 230 after the downlink slot 210. A time interval 230 may be a period of time in which processing may be performed. The one or more time intervals 230 may at least partially overlap in a time domain with the one or more non-downlink slots 220. In some examples, a time interval 230 may correspond to a slot. For instance, a time interval 230 may begin and end with a respective beginning and ending of an uplink slot, a special slot, or a flexible slot. In some examples, a time interval 230 may occur within a slot (e.g., uplink slot, special slot, or flexible slot). For instance, the one or more time intervals 230 may correspond to one or more sub-slots of the one or more non-downlink slots 220. A time interval 230 may be referred to as a "virtual slot" in some cases.

In some examples, an order of transport block processing may be based on a slot index, a transport block index within a slot, or a combination thereof. For example, the UE 115-*a* may process the at least a portion of the multiple transport blocks 215 in an order based on an index of the multiple transport blocks 215 in the downlink slot 210 immediately preceding the one or more non-downlink slots 220. For instance, the UE 115-*a* may process the transport blocks 215 in an index order (e.g., processing may proceed in order of slot index, transport block index, or a combination thereof.

Processing at least a portion of the multiple transport blocks 215 received in a downlink slot 210 after the downlink slot 210 may be based on a timeline extension 225. The timeline extension 225 may be indicated or expressed as at least one of a mapping, message, instruction, command, assignment, delay, quantity, function, association, or information that indicates performing processing in the one or more time intervals 230 after the downlink slot 210.

In some examples, the UE 115-*a* may receive, from the network entity 105-*a*, a control message configuring the UE 115-*a* with the TDD slot configuration. The control message may be included in the message 205 or may be communicated separately. Processing the at least a portion of the multiple transport blocks 215 during the one or more time intervals 230 may be based on a mapping between the downlink slot 210 and the one or more time intervals 230, where the mapping may be associated with the TDD slot configuration. For example, an indication of the time interval 230 or the timeline extension 225 may be implicitly defined. In some examples, multiple transport blocks 215 in the last downlink slot 210 before the one or more non-downlink slots 220 may be mapped to the subsequent available non-downlink slot(s).

The UE 115-*a* may receive, from the network entity 105-*a*, information indicating the one or more time intervals 230 for processing the at least a portion of the multiple transport blocks 215. The information may be included in the message 205 or may be communicated separately. For example, the information may be received via a DCI message, an RRC message, a MAC-CE, or a combination thereof. In some aspects, the network entity 105-*a* may signal the information indicating the one or more time intervals 230. The information may cause the UE 115-*a* to extend the timeline for transport block processing. For instance, excessive transport blocks at the end of a downlink burst may be provided a more relaxed n1 timeline. In some examples, one or more restrictions may be applied to the timing or location of the one or more time intervals 230.

In some examples, the UE 115-*a* may determine that the processing of the at least the portion of the multiple transport blocks 215 during the one or more time intervals 230 is allowed for the downlink slot 210 based on the one or more non-downlink slots 220 including flexible slots. For example, the UE 115-*a* may receive a control message (transmitted from the network entity 105-*a*, for instance) including an indication of the one or more non-downlink slots for which the processing of the at least the portion of the multiple transport blocks 215 during the one or more time intervals 230 is allowed based on the one or more non-downlink slots 220 including the flexible slots. Determining that the processing of the at least the portion of the multiple transport blocks 215 during the one or more time intervals 230 is allowed for the downlink slot 210 may be in accordance with the indication. The control message may include a DCI message or an RRC message. The control message may be included in the message 205 or may be communicated separately. The control message may be sent with an indication of the TDD configuration. In some aspects, there may not be a definitive uplink burst defined or the one or more non-downlink slots 220 may be defined as flexible. In some cases, the one or more non-downlink slots 220 may be defined where the timeline extension 225 from processing excessive transport blocks is allowed.

The multiple transport blocks 215 in the downlink slot 210 may be received by the UE 115-*a* as part of a MIMO transmission. For example, the network entity 105-*a* may transmit the multiple transport blocks 215 in a MIMO transmission using multiple antennas, the UE 115-*a* may receive the multiple transport blocks 215 in a MIMO trans-mission using multiple antennas, or a combination thereof. Processing the at least a portion of the multiple transport blocks 215 during the one or more time intervals 230 may be based on the MIMO transmission in the downlink slot 210 having a greater quantity of layers than a second MIMO transmission in a second downlink slot before the downlink slot 210. For example, a previous MIMO transmission in a downlink slot that precedes the downlink slot 210 may utilize fewer layers (e.g., rank-4) than a quantity of layers (e.g., rank-8) of a scheduled MIMO transmission in the downlink slot 210. For instance, a higher-order MIMO transmission may be scheduled in a last downlink slot 210. In some aspects, a multi-transport block communication may be generated from multiple codewords. In some aspects, the transport blocks 215 may be generated with time domain segmentation, which may depend on a processing timeline capability of the UE 115-*a* or one or more settings.

Additionally, or alternatively, the UE 115-*a* may receive the multiple transport blocks 215 in the downlink slot 210 as part of a CA transmission, a multiple transmission and reception point (mTRP) transmission, a URLLC transmission, or a combination thereof. Processing the at least a portion of the multiple transport blocks 215 during the one or more time intervals 230 may be based on the CA transmission, the mTRP transmission, the URLLC transmission, or a combination thereof. For example, a multi-transport block transmission may be scheduled in the last downlink slot 210 for CA, mTRP, multi-transport block scheduling for URLLC, or single-slot multi-transport block scheduling (which may exceed a non-extended processing timeline of the UE 115-*a*). In some aspects, a processing timeline for at least a portion of the transport blocks 215 may be extended to the one or more non-downlink slots (e.g., S, U, F, or a combination thereof) to utilize the modem processing power.

In some examples, the UE 115-*a* may receive the multiple transport blocks 215 in the downlink slot 210 as part of a code block group (CBG)-based HARQ retransmission. Processing the at least a portion of the multiple transport blocks 215 during the one or more time intervals 230 may be based on the CBG-based HARQ retransmission. For example, a CBG-HARQ retransmission from multiple transport blocks may be grouped together in a last downlink slot 210. In some aspects, a multi-transport block decoding processing time-line for at least a portion of the transport blocks 215 may be extended to the one or more non-downlink slots (e.g., S, U, F, or a combination thereof).

In some aspects, the UE 115-*a* may transmit a capability message indicating a capability of the UE 115-*a* to process the at least the portion of the multiple transport blocks 215 during the one or more time intervals 230. Processing the at least a portion of the multiple transport blocks 215 may be based on the capability of the UE 115-*a*. For example, the UE 115-*a* may have a capability to perform processing with the timeline extension 225, may have a capability to process up to a quantity of data (e.g., quantity of one or more transport blocks 215 or a portion(s) thereof). The capability message may indicate the capability to the network entity 105-*a*, which may schedule the multiple transport blocks 215 accordingly. In some aspects, the network entity 105-*a* may schedule more or fewer transport blocks 215 based on the capability.

The UE 115-*a* may determine that a quantity of the multiple transport blocks 215 satisfies a threshold. Processing the at least a portion of the multiple transport blocks 215 may be based on a timeline that is extended (e.g., the timeline extension 225) in response to the quantity of the multiple transport blocks 215 satisfying the threshold. In some examples, the UE 115-*a* may determine that a processed quantity of the multiple transport blocks 215 satisfies a processing threshold, the UE 115-*a* may drop at least one of the multiple transport blocks 215 in response to the processed quantity of the multiple transport blocks 215 satisfying the processing threshold.

In some aspects, a non-extended (e.g., fixed) timeline may be set according to n1 for when a quantity of transport blocks is less than the threshold. When the quantity of transport blocks satisfies the threshold, the timeline may be extended to one or more timeline extensions (e.g., n1 (1), n1 (2)) as the quantity of transport blocks increases. The quantity of transport blocks may be accommodated up to the processing threshold, which if reached, the UE 115-*a* may drop one or more additional transport blocks or may not process the one or more additional transport blocks.

In some examples, when the timeline is extended to a time interval 230 overlapping with one or more non-downlink slots 220 (e.g., flexible slot(s) or special slot(s)), a slot modem processing budget may be occupied, and the UE 115-*a* may not receive one or more additional transport blocks in the one or more non-downlink slots 220. In some examples, the UE 115-*a* may not receive one or more additional transport block in any slot(s) in between the downlink slot 210 and the corresponding time interval 230 (to avoid out-of-order HARQ processing or a timeline bubble, for instance). In a case of a flexible slot, the network entity 105-*a* may send a signal (e.g., dynamic signal via DCI) indicating the flexible slot as scheduled for uplink communication, as not scheduled for downlink communication, or as unscheduled.

In some examples, the UE 115-*a* may receive downlink data between the downlink slot 210 and the one or more time intervals 230. The UE 115-*a* may send an asynchronous HARQ message in response to the downlink data. In some aspects, asynchronous (e.g., out-of-order) HARQ processing may be supported. When asynchronous HARQ processing is supported, downlink data may be received between the downlink slot 210 and the one or more time intervals 230, as the asynchronous HARQ processing may handle out-of-order retransmissions.

Figure 3:
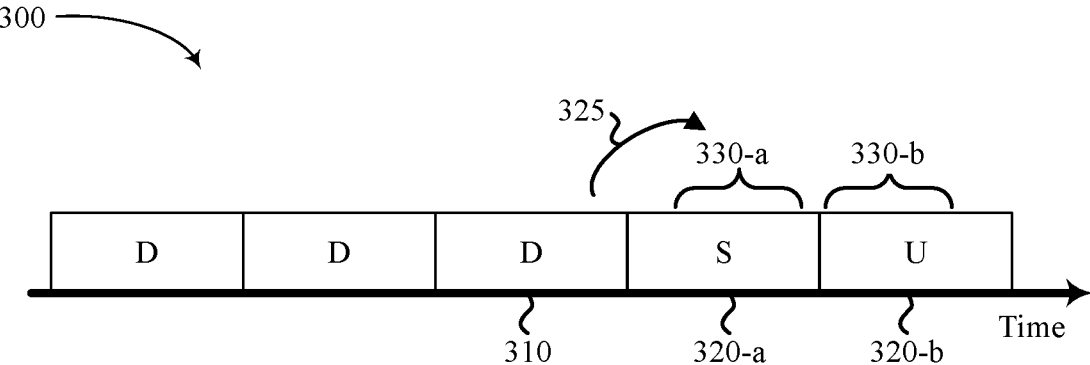
FIG. 3 shows an example of a time-division duplexing (TDD) slot configuration that supports timelines for TDM modem envelope enhancements in accordance with one or more aspects of the present disclosure.

FIG. 3 shows an example of a TDD slot configuration 300 that supports timelines for TDM modem envelope enhancements in accordance with one or more aspects of the present disclosure. The TDD slot configuration 300 may be an example of one or more of the TDD slot configurations described herein with reference to FIG. 1, FIG. 2, or both. In the example of FIG. 3, the TDD slot configuration 300 includes three downlink slots followed by two non-downlink slots (e.g., a special slot 320-*a* and an uplink slot 320-*b*) in time.

In this example, multiple transport blocks may be scheduled and received in a downlink slot 310. In accordance with the techniques described herein, a UE may process at least a portion of the multiple transport blocks in a first time interval 330-*a* in the special slot 320-*a*, in a second time interval 330-*b* in the uplink slot 320-*b*, or a combination thereof. The UE may process at least a portion of the transport blocks using an extended timeline 325 in accordance with one or more of the techniques described herein with reference to FIG. 2. For instance, the extended timeline 325 may include one or more virtual time intervals, which may each have a duration that is similar to a slot duration. In other examples, each time interval of the one or more virtual time intervals may have a duration that is different from a slot duration. In any case, such virtual time intervals (e.g., virtual slots) may enable processing of the transport blocks received via a downlink slot to be processed at a later time (e.g., when a receive modem of the UE may not otherwise be performing demodulation or decoding), which may enhance UE modem processing power utilization.

Figure 4:
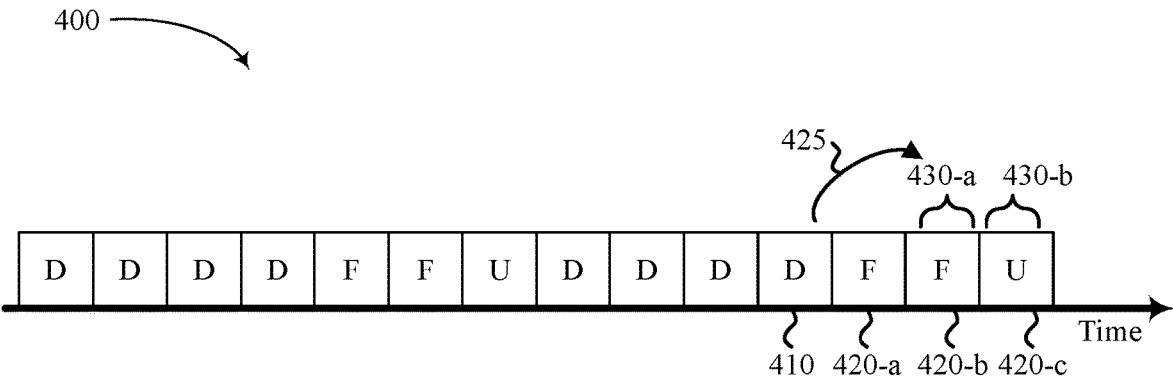
FIG. 4 shows an example of a TDD slot configuration that supports timelines for TDM modem envelope enhancements in accordance with one or more aspects of the present disclosure.

FIG. 4 shows an example of a TDD slot configuration 400 that supports timelines for TDM modem envelope enhancements in accordance with one or more aspects of the present disclosure. The TDD slot configuration 400 may be an example of one or more of the TDD slot configurations described herein with reference to FIG. 1, FIG. 2, or both. In the example of FIG. 4, the TDD slot configuration 400 includes eight downlink slots and six non-downlink slots (e.g., two flexible slots and an uplink slot after the first four downlink slots, and a first flexible slot 420-*a*, a second flexible slot 420-*b*, and an uplink slot 420-*c* after a last downlink slot 410) in time.

In this example, multiple transport blocks may be scheduled and received in a last downlink slot 410. A UE may process at least a portion of the multiple transport blocks in a first time interval 430-*a* in the second flexible slot 420-*b*, in a second time interval 430-*b* in the uplink slot 420-*c*, or a combination thereof. The UE may process at least a portion of the transport blocks using an extended timeline 425 in accordance with one or more of the techniques described herein with reference to FIG. 2. In some aspects, the first flexible slot 420-*a* may be scheduled for uplink transmission, may not be scheduled for downlink transmission, or a combination thereof. In some aspects, the first flexible slot 420-*a* may be scheduled for downlink transmission in a case where asynchronous HARQ is supported as described herein with reference to FIG. 2.

While FIG. 4 illustrates an example of utilizing an extended timeline after the last downlink slot 410 in the TDD slot configuration, some examples of the techniques described herein may be applied to another downlink slot(s), another non-downlink slot(s), or a combination thereof. In one example, an extended timeline may be utilized to process, in a time interval (e.g., the first time interval 430-*a*, the second time interval 430-*b*, or another time interval), a portion of one or more transport blocks scheduled and received in a downlink slot preceding the last downlink slot 410. In another example, an extended timeline may be utilized to process, in a time interval (e.g., a time interval in the flexible slot(s), the uplink slot, or a combination thereof following the fourth downlink slot), for at least a portion of one or more transport blocks scheduled in the fourth downlink slot.

Figure 5:
FIG. 5 shows an example of a process flow that supports timelines for TDM modem envelope enhancements in accordance with one or more aspects of the present disclosure.

FIG. 5 shows an example of a process flow 500 that supports timelines for TDM modem envelope enhancements in accordance with one or more aspects of the present disclosure. The process flow 500 may include a UE 115-*b*, which may be an example of UEs 115, as described herein with reference to FIG. 1 and FIG. 2. The process flow 500 may also include a network entity 105-*b*, which may be an example of the network entities 105, as described herein.

In the following description of the process flow 500, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 500, and other operations may be added to the process flow 500.

In some aspects, at 505, the UE 115-*b* may receive, from the network entity 105-*b*, a message scheduling multiple transport blocks in a downlink slot that immediately precedes one or more non-downlink slots in a TDD slot configuration. Additionally, or alternatively, the network entity 105-*b* may transmit, and the UE 115-*b* may receive, a message scheduling a transport block in the downlink slot that immediately precedes the one or more non-downlink slots in the TDD slot configuration, where the transport block may satisfy (e.g., exceed) a per-slot transport block size threshold. In some cases, the per-slot transport block size threshold may be associated with an HARQ processing timeline. In any case, the UE 115-*b* may receive one or more DCI messages, RRC messages, MAC-CE messages, or a combination thereof as described herein with reference to FIG. 2.

In some examples, the per-slot transport block size threshold may correspond to a maximum per-slot transport block size (in accordance with a capability of the UE 115-*b*, for example) associated with a HARQ timeline (e.g., a "normal" HARQ timeline, a HARQ timeline with an n1 constraint or parameter). For instance, a UE may have a capability to respond within a HARQ timeline (e.g., a quantity of slots, a period, an n1 constraint or parameter) for a transport block up to the per-slot transport block size threshold (without processing the transport block during a non-downlink slot, for instance). In a case that the transport block satisfies the per-slot transport block size threshold (e.g., if the size of the transport block exceeds the per-slot transport block size threshold), the UE 115-*b* may process (or may be configured to process) at least a portion of the transport block during the non-downlink slot. In some examples, a capability of the UE 115-*b*, which may be signaled to a network entity, may be associated with the per-slot transport block size threshold.

In some aspects, at 510, the UE 115-*b* may receive the multiple transport blocks in the downlink slot. For example, the UE 115-*b* may receive the multiple transport blocks in a downlink slot in the TDD slot configuration as described herein with reference to FIG. 2. In other examples, the UE 115-*b* may receive the transport block that satisfies the per-slot transport block size threshold in the downlink slot.

In some aspects, at 515, the UE 115-*b* may process at least a portion of the multiple transport blocks during one or more time intervals that occur after the downlink slot. For example, the UE 115-*b* may process the at least the portion of the multiple transport blocks while transmitting uplink signaling, at 520, in a non-downlink slot as described herein with reference to FIG. 2.

Figure 6:
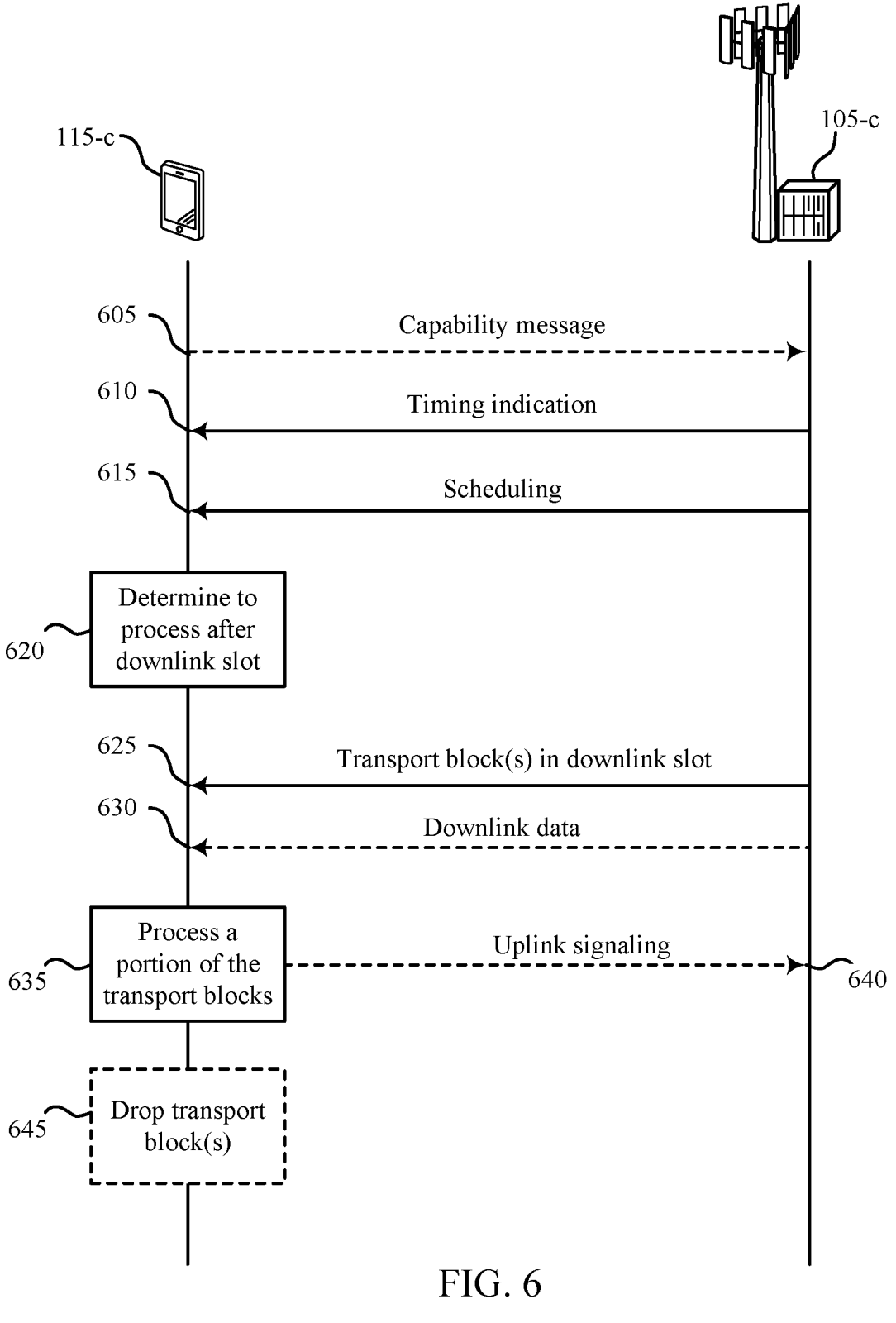
FIG. 6 shows an example of a process flow that supports timelines for TDM modem envelope enhancements in accordance with one or more aspects of the present disclosure.

FIG. 6 shows an example of a process flow 600 that supports timelines for TDM modem envelope enhancements in accordance with one or more aspects of the present disclosure. The process flow 600 may include a UE 115-*c*, which may be an example of UEs 115, as described herein with reference to FIG. 1 and FIG. 2. The process flow 600 may also include a network entity 105-*c*, which may be an example of the network entities 105, as described herein.

In the following description of the process flow 600, the operations between the network entity 105-*c* and the UE 115-*c* may be transmitted in a different order than the example order shown, or the operations performed by the network entity 105-*c* and the UE 115-*c* may be performed in different orders or at different times. Some operations may also be omitted from the process flow 600, and other operations may be added to the process flow 600.

In some aspects, at 605, the UE 115-*c* may transmit a capability message indicating a capability of the UE 115-*c* to process at least a portion of multiple transport blocks during one or more time intervals. For example, the capability message may indicate a capability of the UE 115-*c* to process at least a portion of multiple transport blocks using an extended timeline as described herein with reference to FIG. 2.

In some aspects, at 610, the UE 115-*c* may receive a timing indication. The timing indication may indicate a timing for processing at least a portion of multiple transport blocks using an extended timeline. For example, the timing indication may be a TDD configuration, information indication one or more time intervals, a control message, a DCI message, an RRC message, a MAC-CE message, or a combination thereof as described herein with reference to FIG. 2.

In some aspects, at 615, the UE 115-*c* may receive, from the network entity 105-*c*, a message scheduling multiple transport blocks in a downlink slot that immediately precedes one or more non-downlink slots in a TDD slot configuration. For example, the UE 115-*c* may receive one or more DCI messages, RRC messages, MAC-CE messages, or a combination thereof as described herein with reference to FIG. 2. Additionally, or alternatively, the network entity 105-*c* may transmit, and the UE 115-*c* may receive, a message scheduling a transport block in the downlink slot that immediately precedes the one or more non-downlink slots in the TDD slot configuration. Here, the transport block may satisfy (e.g., exceed) a per-slot transport block size threshold, which may be associated with an HARQ processing timeline.

In some cases, the per-slot transport block size threshold may correspond to a maximum per-slot transport block size (e.g., in accordance with a capability of the UE 115-*c*) associated with a HARQ timeline (e.g., a "normal" HARQ timeline, a HARQ timeline with an n1 constraint or parameter). For instance, the UE 115-*c* may have a capability to respond within a HARQ timeline (e.g., a quantity of slots, a period, an n1 constraint or parameter) for a transport block having a size up to the per-slot transport block size threshold (e.g., without processing the transport block during a non-downlink slot). In a case that the transport block satisfies (e.g., exceeds, is greater than) the per-slot transport block size threshold (e.g., if the size of the transport block exceeds the per-slot transport block size threshold), the UE 115-*b* may process (or may be configured to process) at least a portion of the transport block during the non-downlink slot. In some examples, a capability of the UE 115-*c*, which may be signaled to a network entity, may be associated with the per-slot transport block size threshold.

In some aspects, at 620, the UE 115-*c* may determine to process at least a portion of the transport block or the one or more transport blocks after a downlink slot. For example, the UE 115-*c* may determine that processing is allowed in a flexible slot, may determine processing based on a flexible slot, may determine that a quantity of transport blocks satisfies a threshold, may determine that a quantity of MIMO layers for a last downlink slot is greater than a quantity of MIMO layers for a previous downlink slot, or a combination thereof as described herein with reference to FIG. 2.

In some aspects, at 625, the UE 115-*c* may receive the multiple transport blocks in the downlink slot. For example, the UE 115-*c* may receive the multiple transport blocks in a downlink slot in the TDD slot configuration as described herein with reference to FIG. 2. In other examples, the UE 115-*c* may receive the transport block that satisfies the per-slot transport block size threshold in the downlink slot.

In some aspects, at 630, the UE 115-*c* may receive downlink data between the downlink slot and a time interval. For example, the UE 115-*c* may receive the downlink data in a special slot or flexible slot before the time interval in the TDD slot configuration as described herein with reference to FIG. 2.

In some aspects, at 635, the UE 115-c may process at least a portion of the multiple transport blocks during one or more time intervals that occur after the downlink slot. For example, the UE 115-c may process the at least the portion of the multiple transport blocks while transmitting uplink signaling, at 640, in a non-downlink slot as described herein with reference to FIG. 2. In some examples, in a case of receiving the downlink data at 630, the UE 115-c may send an asynchronous HARQ message in response to the downlink data as described herein with reference to FIG. 2. The asynchronous HARQ message may be sent in the uplink signaling at 640, in separate uplink signaling, or in a combination thereof. In some examples, the UE 115-c may process the at least the portion of the multiple transport blocks in an order based on an index of the multiple transport blocks as described herein with reference to FIG. 2.

In some aspects, at 645, the UE 115-c may drop at least one of the multiple transport blocks in response to the processed quantity of the multiple transport blocks satisfying a processing threshold. For example, the UE 115-c may determine that a processed quantity of the multiple transport blocks satisfies a processing threshold and may drop one or more transport blocks in response to the processed quantity satisfying the processing threshold as described herein with reference to FIG. 2.

Figure 7:
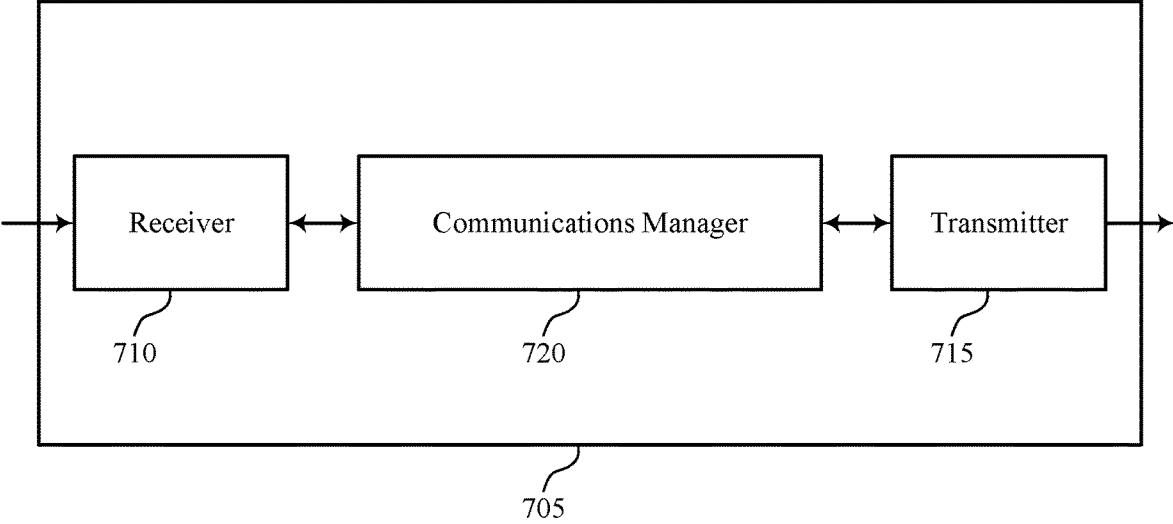
FIGS. 7 and 8 show block diagrams of devices that support timelines for TDM modem envelope enhancements in accordance with one or more aspects of the present disclosure.

FIG. 7 shows a block diagram 700 of a device 705 that supports timelines for TDM modem envelope enhancements in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to timelines for TDM modem envelope enhancements). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to timelines for TDM modem envelope enhancements). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of timelines for TDM modem envelope enhancements as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 is capable of, configured to, or operable to support a means for receiving, from a network entity, a message scheduling a transport block or multiple transport blocks in a downlink slot that immediately precedes one or more non-downlink slots in a TDD slot configuration. The communications manager 720 is capable of, configured to, or operable to support a means for receiving the transport block or the multiple transport blocks in the downlink slot, where the transport block satisfies a per-slot transport block size threshold that is associated with an HARQ processing timeline. The communications manager 720 is capable of, configured to, or operable to support a means for processing at least a portion of the transport block or at least a portion of the multiple transport blocks during one or more time intervals that occur after the downlink slot.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for higher data rates, increased capacity, increased spectral efficiency, or a combination thereof.

Figure 8:
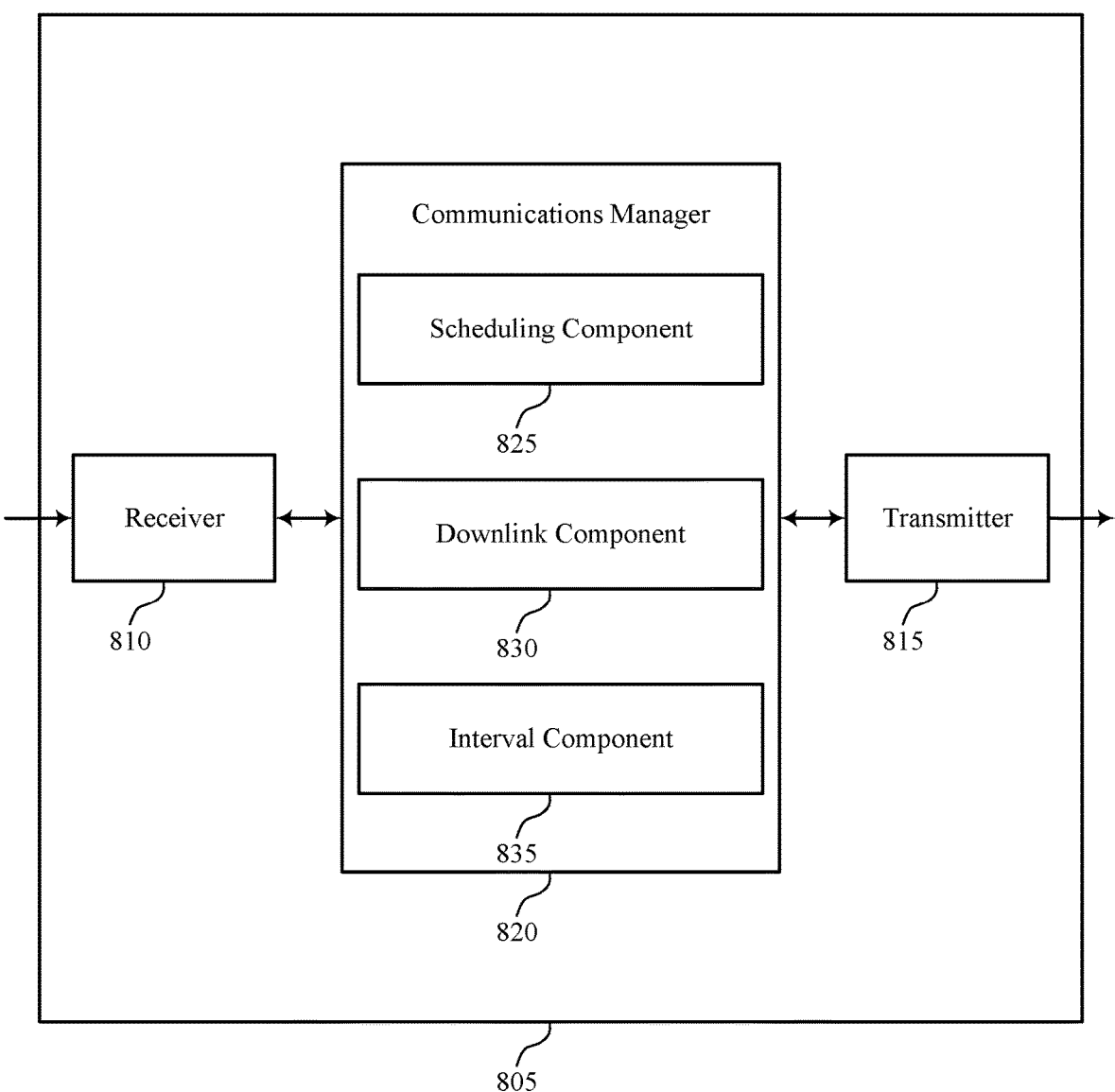

FIG. 8 shows a block diagram 800 of a device 805 that supports timelines for TDM modem envelope enhancements in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to timelines for TDM modem envelope enhancements). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to timelines for TDM modem envelope enhancements). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of timelines for TDM modem envelope enhancements as described herein. For example, the communications manager 820 may include a scheduling component 825, a downlink component 830, an interval component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The scheduling component 825 is capable of, configured to, or operable to support a means for receiving, from a network entity, a message scheduling a transport block or multiple transport blocks in a downlink slot that immediately precedes one or more non-downlink slots in a TDD slot configuration. The downlink component 830 is capable of, configured to, or operable to support a means for receiving the transport block or the multiple transport blocks in the downlink slot, where the transport block satisfies a per-slot transport block size threshold that is associated with an HARQ processing timeline. The interval component 835 is capable of, configured to, or operable to support a means for processing at least a portion of the transport block or at least a portion of the multiple transport blocks during one or more time intervals that occur after the downlink slot.

Figure 9:
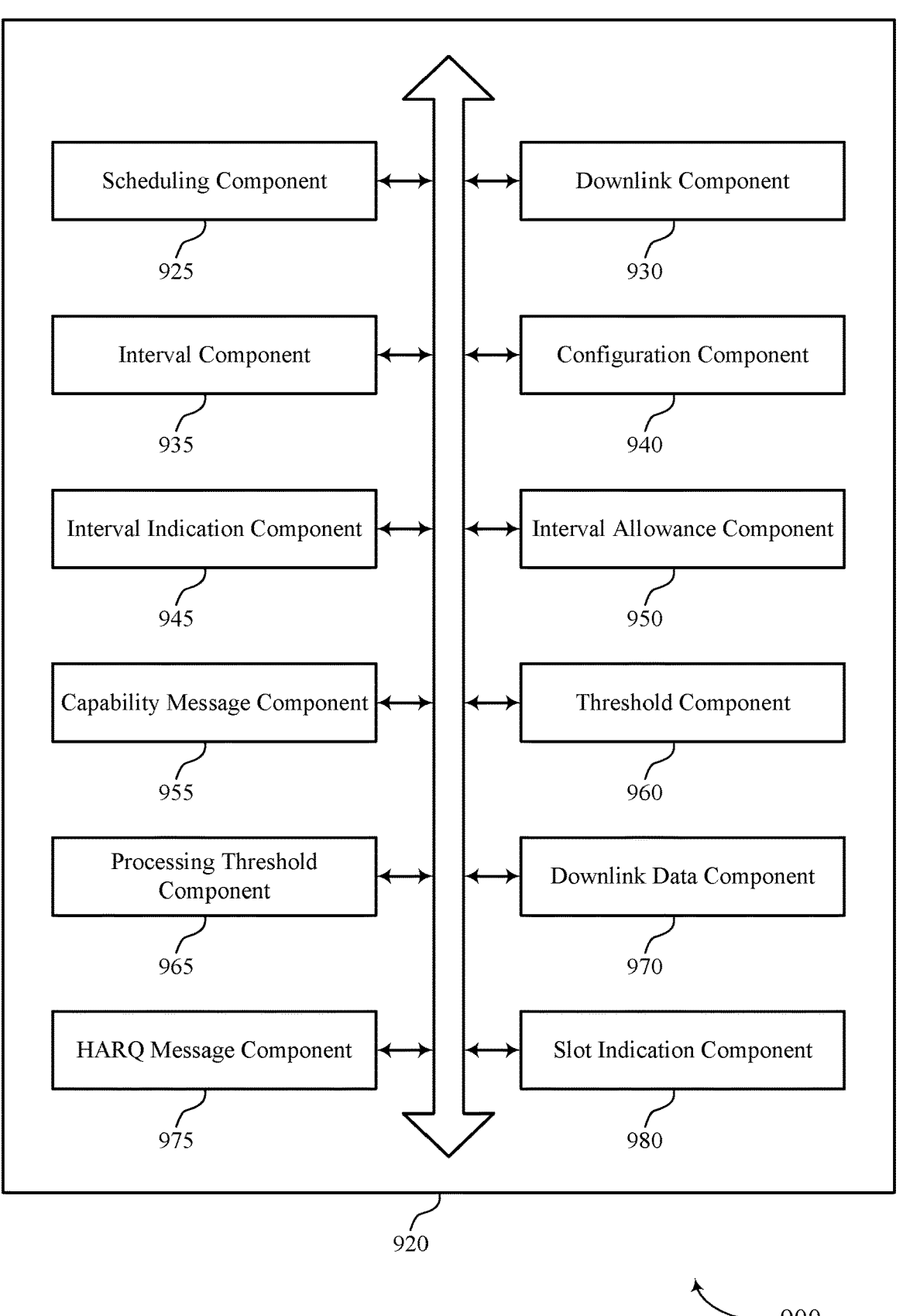
FIG. 9 shows a block diagram of a communications manager that supports timelines for TDM modem envelope enhancements in accordance with one or more aspects of the present disclosure.

FIG. 9 shows a block diagram 900 of a communications manager 920 that supports timelines for TDM modem envelope enhancements in accordance with one or more aspects of the present disclosure. The communications manager 920 may be an example of aspects of a communications manager 720, a communications manager 820, or both, as described herein. The communications manager 920, or various components thereof, may be an example of means for performing various aspects of timelines for TDM modem envelope enhancements as described herein. For example, the communications manager 920 may include a scheduling component 925, a downlink component 930, an interval component 935, a configuration component 940, an interval indication component 945, an interval allowance component 950, a capability message component 955, a threshold component 960, a processing threshold component 965, a downlink data component 970, an HARQ message component 975, a slot indication component 980, or any combination thereof. Each of these components, or components or subcomponents thereof (e.g., one or more processors, one or more memories), may communicate, directly or indirectly, with one another (e.g., via one or more buses).

The communications manager 920 may support wireless communications at a UE in accordance with examples as disclosed herein. The scheduling component 925 is capable of, configured to, or operable to support a means for receiving, from a network entity, a message scheduling a transport block or multiple transport blocks in a downlink slot that immediately precedes one or more non-downlink slots in a TDD slot configuration. The downlink component 930 is capable of, configured to, or operable to support a means for receiving the transport block or the multiple transport blocks in the downlink slot, where the transport block satisfies a per-slot transport block size threshold that is associated with an HARQ processing timeline. The interval component 935 is capable of, configured to, or operable to support a means for processing at least a portion of the transport block or at least a portion of the multiple transport blocks during one or more time intervals that occur after the downlink slot.

In some examples, the configuration component 940 is capable of, configured to, or operable to support a means for receiving, from the network entity, a control message configuring the UE with the TDD slot configuration, where processing the at least a portion of the transport block or the at least a portion of the multiple transport blocks during the one or more time intervals is based on a mapping between the downlink slot and the one or more time intervals, the mapping being associated with the TDD slot configuration.

In some examples, the interval indication component 945 is capable of, configured to, or operable to support a means for receiving, from the network entity, information indicating the one or more time intervals for processing the at least a portion of the transport block or the at least a portion of the multiple transport blocks. In some examples, the information is received via a DCI message, an RRC message, a MAC-CE, or a combination thereof.

In some examples, the interval allowance component 950 is capable of, configured to, or operable to support a means for determining that the processing of the at least a portion of the transport block or the at least a portion of the multiple transport blocks during the one or more time intervals is allowed for the downlink slot based on the one or more non-downlink slots including flexible slots.

In some examples, the slot indication component 980 is capable of, configured to, or operable to support a means for receiving a control message including an indication of one or more slots for which the processing of the at least a portion of the transport block or the at least a portion of the multiple transport blocks during the one or more time intervals is allowed based on the one or more non-downlink slots including the flexible slots, where determining that the processing of the at least the portion of the multiple transport blocks during the one or more time intervals is allowed for the downlink slot is in accordance with the indication. In some examples, the control message includes a DCI message or an RRC message.

In some examples, the capability message component 955 is capable of, configured to, or operable to support a means for transmitting a capability message indicating a capability of the UE to process the at least a portion of the transport block or the at least a portion of the multiple transport blocks during the one or more time intervals, where the processing is based on the capability of the UE.

In some examples, the threshold component 960 is capable of, configured to, or operable to support a means for determining that a quantity of the multiple transport blocks satisfies a threshold, where processing the at least a portion of the multiple transport blocks is based on a timeline that is extended in response to the quantity of the multiple transport blocks satisfying the threshold.

In some examples, the threshold component 960 is capable of, configured to, or operable to support a means for determining that a size of the transport block satisfies the threshold (e.g., the per-slot transport block size threshold), where processing the at least the portion of the transport block is based on a timeline that is extended in response to the size of the transport block satisfying the threshold.

In some examples, the processing threshold component 965 is capable of, configured to, or operable to support a means for determining that a processed quantity of the multiple transport blocks satisfies a processing threshold. In some examples, the processing threshold component 965 is capable of, configured to, or operable to support a means for dropping at least one of the multiple transport blocks in response to the processed quantity of the multiple transport blocks satisfying the processing threshold.

In some examples, the downlink data component 970 is capable of, configured to, or operable to support a means for receiving downlink data between the downlink slot and the one or more time intervals. In some examples, the HARQ message component 975 is capable of, configured to, or operable to support a means for sending an asynchronous HARQ message in response to the downlink data.

In some examples, to support receiving the multiple transport blocks, the downlink component 930 is capable of, configured to, or operable to support a means for receiving the multiple transport blocks in the downlink slot as part of a MIMO transmission, where processing the at least a portion of the multiple transport blocks during the one or more time intervals is based on the MIMO transmission in the downlink slot having a greater quantity of layers than a second MIMO transmission in a second downlink slot before the downlink slot.

In some examples, to support receiving the transport block, the downlink component 930 is capable of, configured to, or operable to support a means for receiving the transport block in the downlink slot as part of a MIMO transmission, where processing the at least a portion of the transport block during the one or more time intervals is based on a size of the transport block for a quantity of layers of the MIMO transmission exceeding a capability of the UE associated with the HARQ processing timeline.

For example, a UE may have a capability to process a transport block up to a size corresponding to a quantity of MIMO layers associated with a HARQ processing timeline (e.g., a "normal" HARQ processing timeline, a HARQ processing timeline with an n1 constraint). For instance, a UE may have a capability to respond within a HARQ processing timeline (e.g., a quantity of slots, a period, an n1 constraint) for a transport block up to a transport block size for a quantity of MIMO layers. The capability of the UE to process a transport block size may vary based on the quantity of MIMO layers (without processing the transport block during a non-downlink slot, for instance). In a case that the transport block exceeds the UE capability for a quantity of MIMO layers, (e.g., if the size of the transport block exceeds a size threshold corresponding to a quantity of MIMO layers), a UE may process (or may be configured to process) at least a portion of the transport block during the non-downlink slot. In some examples, a UE capability, which may be signaled to a network entity, may be associated with one or more size thresholds associated with one or more quantities of MIMO layers.

In some examples, to support receiving the multiple transport blocks in the downlink slot, the downlink component 930 is capable of, configured to, or operable to support a means for receiving the multiple transport blocks in the downlink slot as part of a CA transmission, an mTRP transmission, an URLLC transmission, or a combination thereof, where processing the at least a portion of the multiple transport blocks during the one or more time intervals is based on the CA transmission, the mTRP transmission, the URLLC transmission, or a combination thereof.

In some examples, to support receiving the multiple transport blocks in the downlink slot, the downlink component 930 is capable of, configured to, or operable to support a means for receiving the multiple transport blocks in the downlink slot as part of a CBG-based HARQ retransmission, where processing the at least a portion of the multiple transport blocks during the one or more time intervals is based on the CBG-based HARQ retransmission.

In some examples, the one or more time intervals at least partially overlap in a time domain with the one or more non-downlink slots. In some examples, the one or more non-downlink slots include one or more uplink slots, special slots, flexible slots, or a combination thereof.

In some examples, to support processing the at least a portion of the multiple transport blocks, the interval component 935 is capable of, configured to, or operable to support a means for processing the at least a portion of the multiple transport blocks in an order based on an index of the multiple transport blocks in the downlink slot immediately preceding the one or more non-downlink slots.

In some examples, the one or more time intervals correspond to one or more sub-slots of the non-downlink slots.

Figure 10:
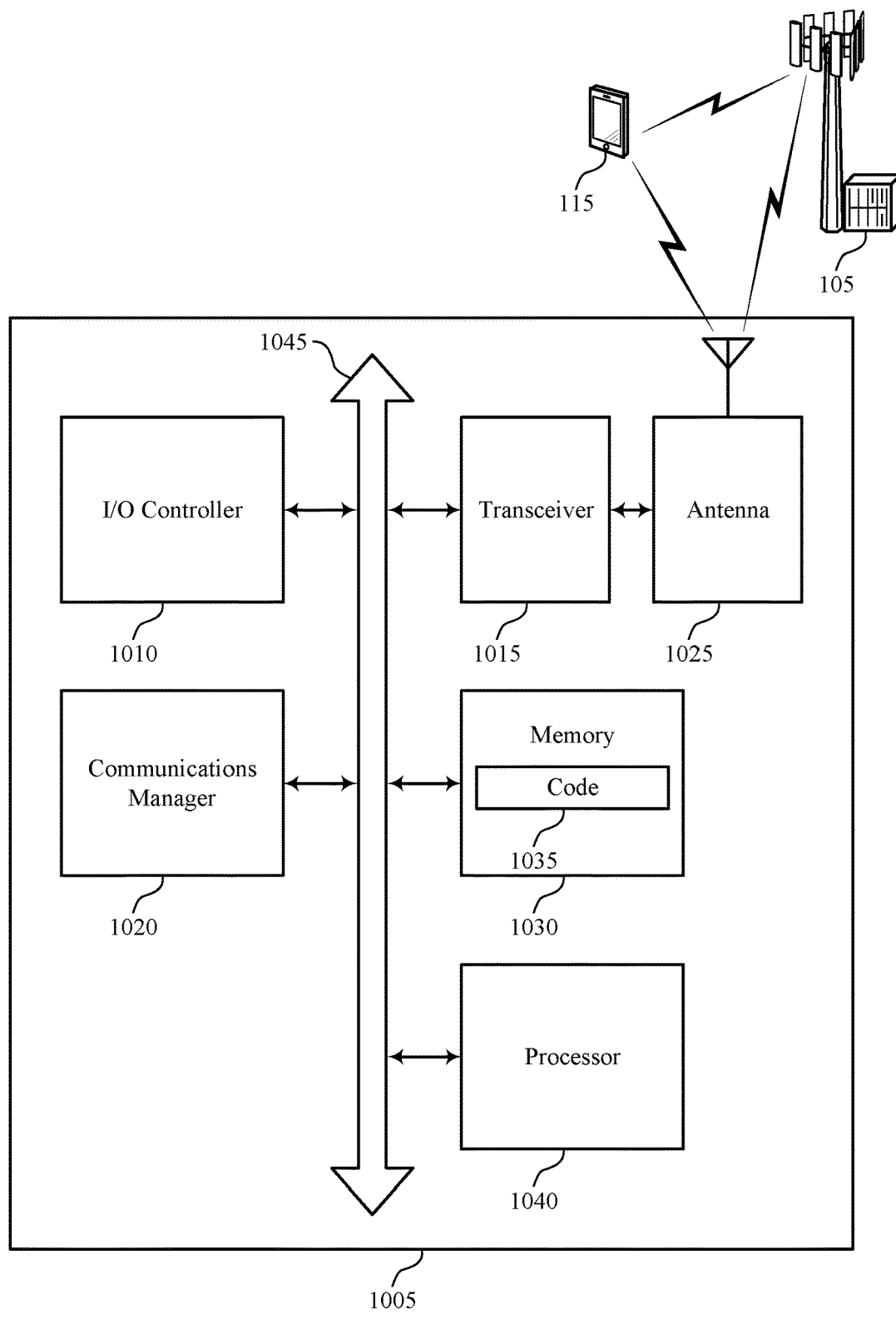
FIG. 10 shows a diagram of a system including a device that supports timelines for TDM modem envelope enhancements in accordance with one or more aspects of the present disclosure.

FIG. 10 shows a diagram of a system 1000 including a device 1005 that supports timelines for TDM modem envelope enhancements in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting timelines for TDM modem envelope enhancements). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 is capable of, configured to, or operable to support a means for receiving, from a network entity, a message scheduling a transport block or multiple transport blocks in a downlink slot that immediately precedes one or more non-downlink slots in a TDD slot configuration. The communications manager 1020 is capable of, configured to, or operable to support a means for receiving the transport block or the multiple transport blocks in the downlink slot, where the transport block satisfies a per-slot transport block size threshold that is associated with an HARQ processing timeline. The communications manager 1020 is capable of, configured to, or operable to support a means for processing at least a portion of the transport block or at least a portion of the multiple transport blocks during one or more time intervals that occur after the downlink slot.

By including or configuring the communications manager 1020 in accordance with examples as described herein, the device 1005 may support techniques for reduced latency, improved user experience related to increased processing efficiency, reduced power consumption, more efficient utilization of communication resources, improved coordination between devices, longer battery life, improved utilization of processing capability, or a combination thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of timelines for TDM modem envelope enhancements as described herein, or the processor 1040 and the memory 1030 may be otherwise configured to perform or support such operations.

Figure 11:
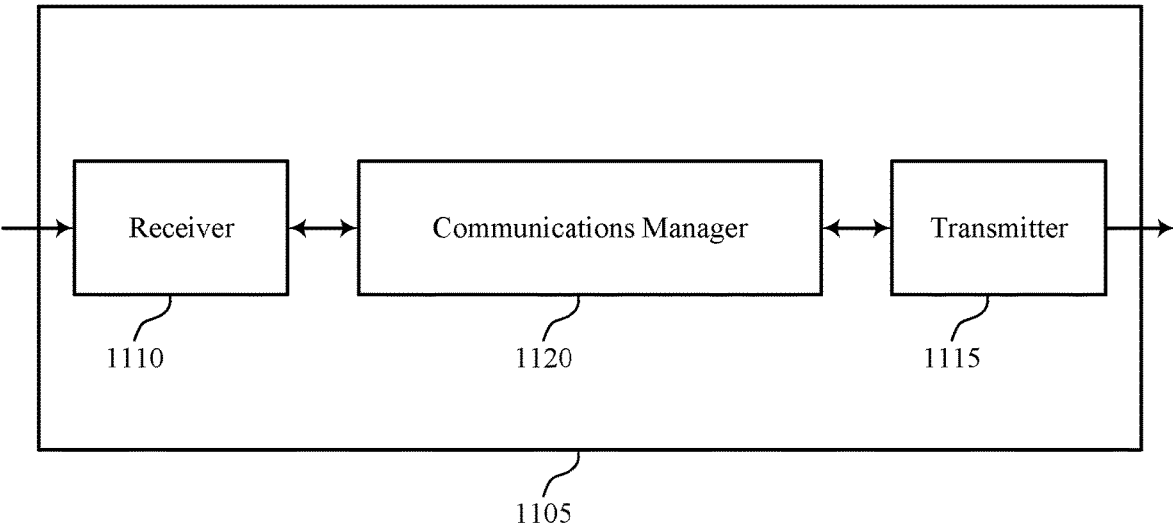
FIGS. 11 and 12 show block diagrams of devices that support timelines for TDM modem envelope enhancements in accordance with one or more aspects of the present disclosure.

FIG. 11 shows a block diagram 1100 of a device 1105 that supports timelines for TDM modem envelope enhancements in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of timelines for TDM modem envelope enhancements as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processor, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 is capable of, configured to, or operable to support a means for transmitting, to a UE, a message for configuring the UE to process at least a portion of data corresponding to a downlink slot after the downlink slot and during one or more time intervals. The communications manager 1120 is capable of, configured to, or operable to support a means for transmitting, to a UE, a message scheduling a transport block or multiple transport blocks in a downlink slot that immediately precedes one or more non-downlink slots in a time division-duplexing slot configuration. The communications manager 1120 is capable of, configured to, or operable to support a means for transmitting the transport block or the multiple transport blocks in the downlink slot, where the transport block satisfies a per-slot transport block size threshold that is associated with an HARQ processing timeline By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for increased processing efficiency, reduced power consumption, more efficient utilization of communication resources, or a combination thereof.

Figure 12:
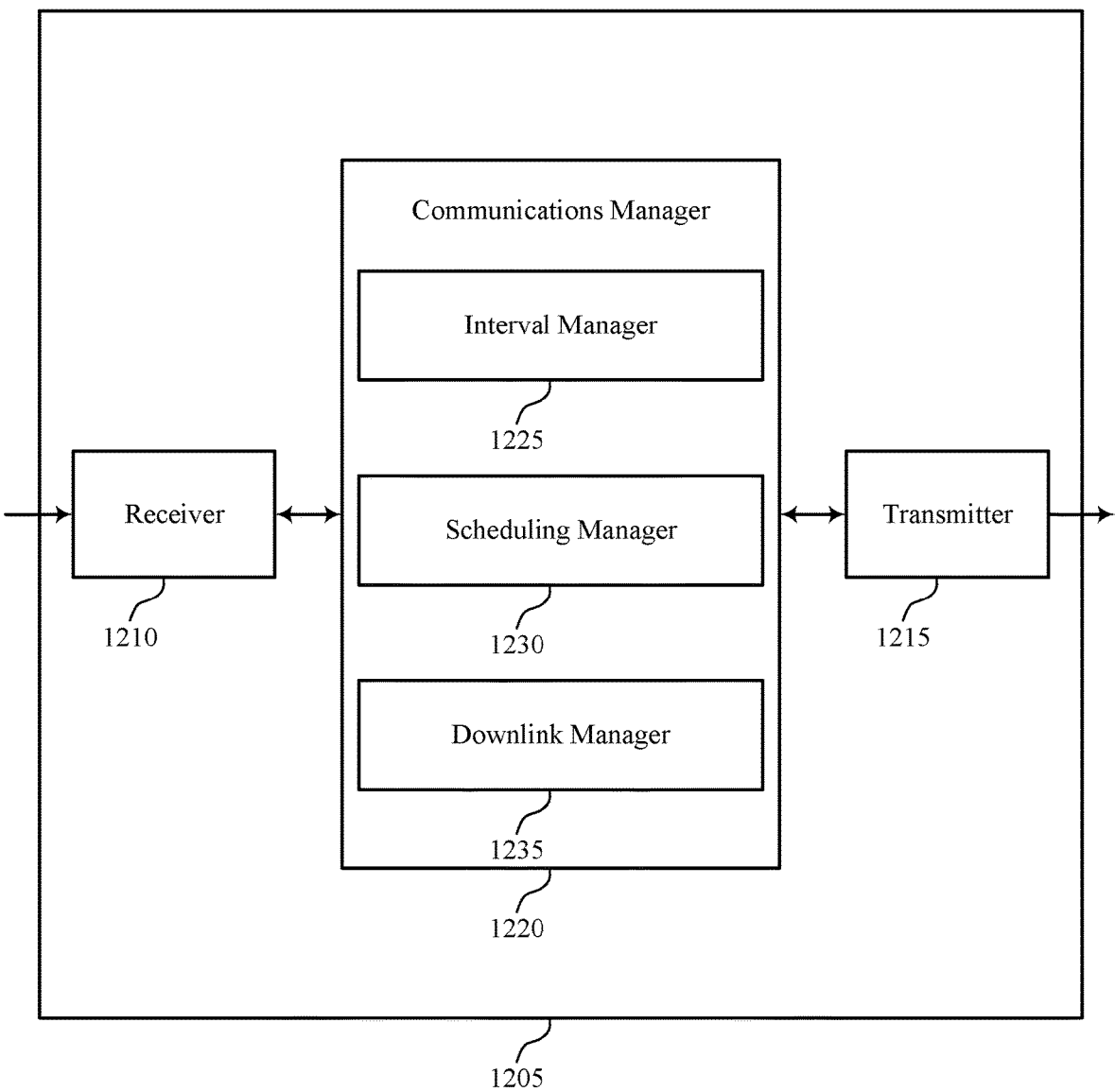

FIG. 12 shows a block diagram 1200 of a device 1205 that supports timelines for TDM modem envelope enhancements in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of timelines for TDM modem envelope enhancements as described herein. For example, the communications manager 1220 may include an interval manager 1225, a scheduling manager 1230, a downlink manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

Figure 13:
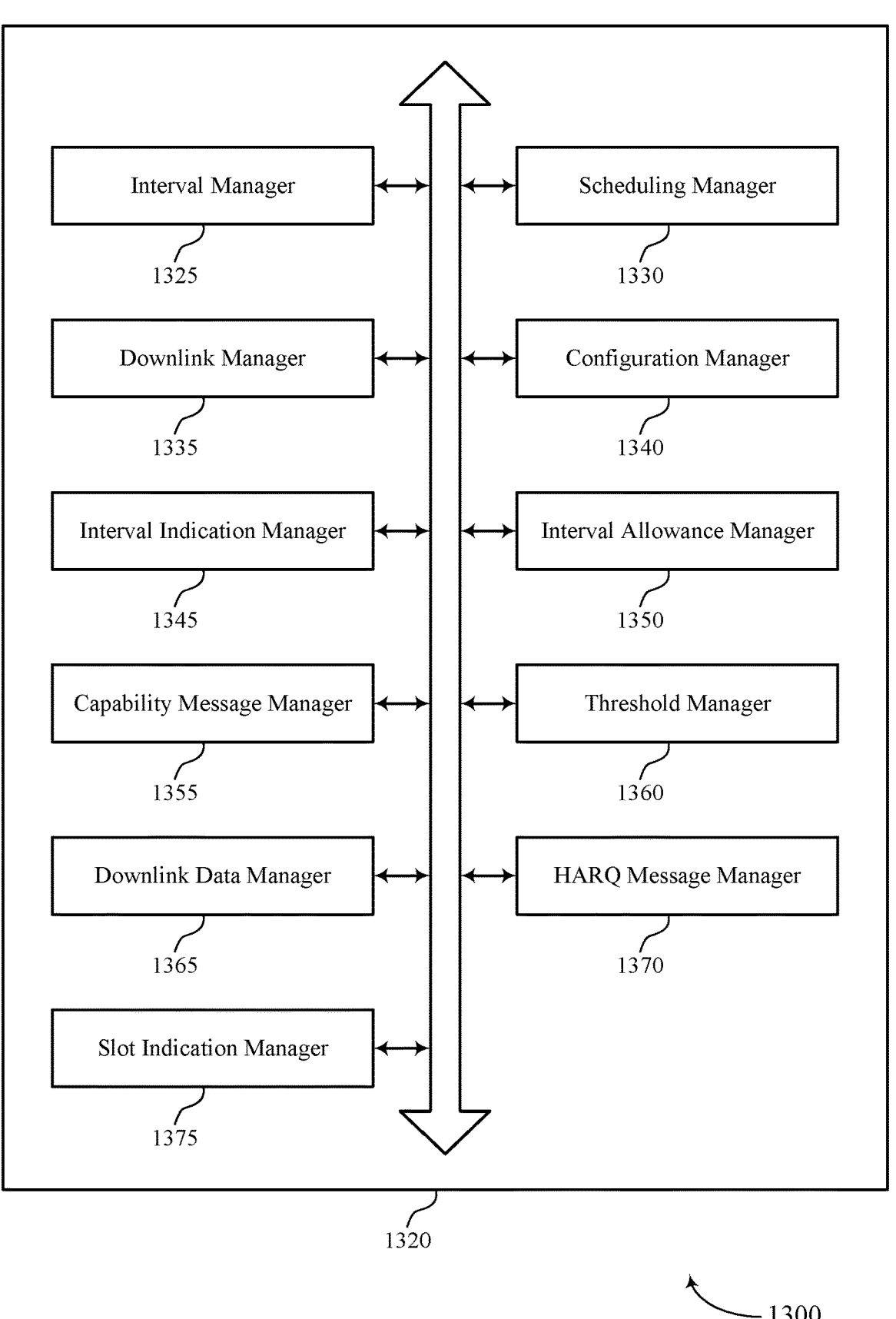
FIG. 13 shows a block diagram of a communications manager that supports timelines for TDM modem envelope enhancements in accordance with one or more aspects of the present disclosure.

The communications manager 1220 may support wireless communications at a network entity in accordance with examples as disclosed herein. The interval manager 1225 is capable of, configured to, or operable to support a means for transmitting, to a UE, a message for configuring the UE to process at least a portion of data corresponding to a downlink slot after the downlink slot and during one or more time intervals. The scheduling manager 1230 is capable of, configured to, or operable to support a means for transmitting, to the UE, a message scheduling a transport block or multiple transport blocks in a downlink slot that immediately precedes one or more non-downlink slots in a time division-duplexing slot configuration. The downlink manager 1235 is capable of, configured to, or operable to support a means for transmitting the transport block or the multiple transport blocks in the downlink slot, where the transport block satisfies a per-slot transport block size threshold that is associated with an HARQ processing timeline FIG. 13 shows a block diagram 1300 of a communications manager 1320 that supports timelines for TDM modem envelope enhancements in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of timelines for TDM modem envelope enhancements as described herein. For example, the communications manager 1320 may include an interval manager 1325, a scheduling manager 1330, a downlink manager 1335, a configuration manager 1340, an interval indication manager 1345, an interval allowance manager 1350, a capability message manager 1355, a threshold manager 1360, a downlink data manager 1365, an HARQ message manager 1370, a slot indication manager 1375, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The interval manager 1325 is capable of, configured to, or operable to support a means for transmitting, to a UE, a message for configuring the UE to process at least a portion of data corresponding to a downlink slot after the downlink slot and during one or more time intervals. The scheduling manager 1330 is capable of, configured to, or operable to support a means for transmitting, to the UE, a message scheduling a transport block or multiple transport blocks in a downlink slot that immediately precedes one or more non-downlink slots in a time division-duplexing slot configuration. The downlink manager 1335 is capable of, configured to, or operable to support a means for transmitting the transport block or the multiple transport blocks in the downlink slot, where the transport block satisfies a per-slot transport block size threshold that is associated with an HARQ processing timeline In some examples, the configuration manager 1340 is capable of, configured to, or operable to support a means for transmitting, to the UE, a control message configuring the UE with a TDD slot configuration, where configuring the UE to process the at least a portion of the multiple transport blocks during the one or more time intervals is based on a mapping between the downlink slot and the one or more time intervals, the mapping being associated with the TDD slot configuration.

In some examples, the interval indication manager 1345 is capable of, configured to, or operable to support a means for transmitting, to the UE, information indicating the one or more time intervals for processing the at least a portion of the transport block or the at least a portion of the multiple transport blocks. In some examples, the information is transmitted via a DCI message, an RRC message, a MAC-CE, or a combination thereof.

In some examples, the interval allowance manager 1350 is capable of, configured to, or operable to support a means for determining that the processing of the at least a portion of the transport block or the at least a portion of the multiple transport blocks during the one or more time intervals is allowed for the downlink slot based on the one or more non-downlink slots including flexible slots.

In some examples, the slot indication manager 1375 is capable of, configured to, or operable to support a means for transmitting a control message including an indication of one or more slots for which the processing of the at least a portion of the transport block or the at least a portion of the multiple transport blocks during the one or more time intervals is allowed based on the one or more non-downlink slots including the flexible slots, where determining that the processing of the at least the portion of the multiple transport blocks during the one or more time intervals is allowed for the downlink slot is in accordance with the indication. In some examples, the control message includes a DCI message or an RRC message.

In some examples, the capability message manager 1355 is capable of, configured to, or operable to support a means for receiving a capability message indicating a capability of the UE to process the at least a portion of the transport block or the at least a portion of the multiple transport blocks during the one or more time intervals, where configuring the UE is based on the capability of the UE.

In some examples, the threshold manager 1360 is capable of, configured to, or operable to support a means for determining that a quantity of the multiple transport blocks satisfies a threshold, where configuring the UE to process the at least a portion of the multiple transport blocks is based on a timeline that is extended in response to the quantity of the multiple transport blocks satisfying the threshold.

In some examples, the threshold manager 1360 is capable of, configured to, or operable to support a means for determining that a size of the transport block satisfies the threshold (e.g., the per-slot transport block size threshold), where configuring the UE to process the at least the portion of the transport block is based on a timeline that is extended in response to the size of the transport block satisfying the threshold.

In some examples, the downlink data manager 1365 is capable of, configured to, or operable to support a means for transmitting downlink data between the downlink slot and the one or more time intervals. In some examples, the HARQ message manager 1370 is capable of, configured to, or operable to support a means for receiving an asynchronous HARQ message in response to the downlink data.

In some examples, to support transmitting the multiple transport blocks, the downlink manager 1335 is capable of, configured to, or operable to support a means for transmitting the multiple transport blocks in the downlink slot as part of a MIMO transmission, where the MIMO transmission in the downlink slot has a greater quantity of layers than a second MIMO transmission in a second downlink slot before the downlink slot.

In some examples, to support transmitting the transport block, the downlink manager 1335 is capable of, configured to, or operable to support a means for transmitting the transport block in the downlink slot as part of a MIMO transmission, where a size of the transport block for a quantity of layers of the MIMO transmission exceeds a capability of the UE associated with the HARQ processing timeline.

In some examples, to support transmitting the multiple transport blocks, the downlink manager 1335 is capable of, configured to, or operable to support a means for transmitting the multiple transport blocks in the downlink slot as part of a CA transmission, an mTRP transmission, an URLLC transmission, or a combination thereof.

In some examples, to support transmitting the multiple transport blocks in the downlink slot, the downlink manager 1335 is capable of, configured to, or operable to support a means for transmitting the multiple transport blocks in the downlink slot as part of a CBG-based HARQ retransmission.

In some examples, the one or more time intervals at least partially overlap in a time domain with the one or more non-downlink slots. In some examples, the one or more non-downlink slots include one or more uplink slots, special slots, flexible slots, or a combination thereof. In some examples, the one or more time intervals correspond to one or more sub-slots of the non-downlink slots.

Figure 14:
FIG. 14 shows a diagram of a system including a device that supports timelines for TDM modem envelope enhancements in accordance with one or more aspects of the present disclosure.

FIG. 14 shows a diagram of a system 1400 including a device 1405 that supports timelines for TDM modem envelope enhancements in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting timelines for TDM modem envelope enhancements). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 is capable of, configured to, or operable to support a means for transmitting, to a UE, a message for configuring the UE to process at least a portion of data corresponding to a downlink slot after the downlink slot and during one or more time intervals. The communications manager 1420 is capable of, configured to, or operable to support a means for transmitting, to the UE, a message scheduling a transport block or multiple transport blocks in a downlink slot that immediately precedes one or more non-downlink slots in a time division-duplexing slot configuration. The communications manager 1420 is capable of, configured to, or operable to support a means for transmitting the transport block or the multiple transport blocks in the downlink slot, where the transport block satisfies a per-slot transport block size threshold that is associated with an HARQ processing timeline By including or configuring the communications manager 1420 in accordance with examples as described herein, the device 1405 may support techniques for reduced latency, improved user experience related to increased processing efficiency, reduced power consumption, more efficient utilization of communication resources, or a combination thereof.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of timelines for TDM modem envelope enhancements as described herein, or the processor 1435 and the memory 1425 may be otherwise configured to perform or support such operations.

FIG. 15 shows a flowchart illustrating a method 1500 that supports timelines for TDM modem envelope enhancements in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, a message scheduling a transport block or multiple transport blocks in a downlink slot that immediately precedes one or more non-downlink slots in a TDD slot configuration. The operations of 1505 may be performed in accordance with examples as disclosed herein. In some examples, aspects of the operations of 1505 may be performed by a scheduling component 925 as described with reference to FIG. 9.

At 1510, the method may include receiving the transport block or the multiple transport blocks in the downlink slot, where the transport block satisfies a per-slot transport block size threshold that is associated with an HARQ processing timeline. The operations of 1510 may be performed in accordance with examples as disclosed herein. In some examples, aspects of the operations of 1510 may be performed by a downlink component 930 as described with reference to FIG. 9.

At 1515, the method may include processing at least a portion of the transport block or at least a portion of the multiple transport blocks during one or more time intervals that occur after the downlink slot. The operations of 1515 may be performed in accordance with examples as disclosed herein. In some examples, aspects of the operations of 1515 may be performed by an interval component 935 as described with reference to FIG. 9.

FIG. 16 shows a flowchart illustrating a method 1600 that supports timelines for TDM modem envelope enhancements in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, from the network entity, a control message configuring the UE with the TDD slot configuration. The operations of 1605 may be performed in accordance with examples as disclosed herein. In some examples, aspects of the operations of 1605 may be performed by a configuration component 940 as described with reference to FIG. 9.

At 1610, the method may include receiving, from a network entity, a message scheduling a transport block or multiple transport blocks in a downlink slot that immediately precedes one or more non-downlink slots in a TDD slot configuration. The operations of 1610 may be performed in accordance with examples as disclosed herein. In some examples, aspects of the operations of 1610 may be performed by a scheduling component 925 as described with reference to FIG. 9.

At 1615, the method may include receiving the transport block or the multiple transport blocks in the downlink slot, where the transport block satisfies a per-slot transport block size threshold that is associated with an HARQ processing timeline. The operations of 1615 may be performed in accordance with examples as disclosed herein. In some examples, aspects of the operations of 1615 may be performed by a downlink component 930 as described with reference to FIG. 9.

At 1620, the method may include processing at least a portion of the transport block or at least a portion of the multiple transport blocks during one or more time intervals that occur after the downlink slot, where processing the at least a portion of the multiple transport blocks during the one or more time intervals is based on a mapping between the downlink slot and the one or more time intervals, the mapping being associated with the TDD slot configuration. The operations of 1620 may be performed in accordance with examples as disclosed herein. In some examples, aspects of the operations of 1620 may be performed by an interval component 935 as described with reference to FIG. 9.

FIG. 17 shows a flowchart illustrating a method 1700 that supports timelines for TDM modem envelope enhancements in accordance with aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, a message for configuring the UE to process at least a portion of data corresponding to a downlink slot after the downlink slot and during one or more time intervals. The operations of 1705 may be performed in accordance with examples as disclosed herein. In some examples, aspects of the operations of 1705 may be performed by an interval manager 1325 as described with reference to FIG. 13.

At 1710, the method may include transmitting, to the UE, a message scheduling a transport block or multiple transport blocks in a downlink slot that immediately precedes one or more non-downlink slots in a TDD slot configuration. The operations of 1710 may be performed in accordance with examples as disclosed herein. In some examples, aspects of the operations of 1710 may be performed by a scheduling manager 1330 as described with reference to FIG. 13.

At 1715, the method may include transmitting the transport block or the multiple transport blocks in the downlink slot, where the transport block satisfies a per-slot transport block size threshold that is associated with an HARQ processing timeline. The operations of 1715 may be performed in accordance with examples as disclosed herein. In some examples, aspects of the operations of 1715 may be performed by a downlink manager 1335 as described with reference to FIG. 13.

FIG. 18 shows a flowchart illustrating a method 1800 that supports timelines for TDM modem envelope enhancements in accordance with aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to the UE, a control message configuring the UE with a TDD slot configuration. The operations of 1805 may be performed in accordance with examples as disclosed herein. In some examples, aspects of the operations of 1805 may be performed by a configuration manager 1340 as described with reference to FIG. 13.

At 1810, the method may include transmitting, to a UE, a message for configuring the UE to process at least a portion of data corresponding to a downlink slot after the downlink slot and during one or more time intervals, where configuring the UE to process the at least a portion of the data during the one or more time intervals is based on a mapping between the downlink slot and the one or more time intervals, the mapping being associated with the TDD slot configuration. The operations of 1810 may be performed in accordance with examples as disclosed herein. In some examples, aspects of the operations of 1810 may be performed by an interval manager 1325 as described with reference to FIG. 13.

At 1815, the method may include transmitting, to a UE, a message scheduling a transport block or multiple transport blocks in a downlink slot that immediately precedes one or more non-downlink slots in a time division-duplexing slot configuration. The operations of 1815 may be performed in accordance with examples as disclosed herein. In some examples, aspects of the operations of 1815 may be performed by a scheduling manager 1330 as described with reference to FIG. 13.

At 1820, the method may include transmitting the transport block or the multiple transport blocks in the downlink slot, where the transport block satisfies a per-slot transport block size threshold that is associated with an HARQ processing timeline. The operations of 1820 may be performed in accordance with examples as disclosed herein. In some examples, aspects of the operations of 1820 may be performed by a downlink manager 1335 as described with reference to FIG. 13.

The following provides an overview of aspects of the present disclosure:

Aspect 1: A method for wireless communications at a UE, comprising: receiving, from a network entity, a message scheduling a transport block or multiple transport blocks in a downlink slot that immediately precedes one or more non-downlink slots in a TDD slot configuration; receiving the transport block or the multiple transport blocks in the downlink slot, wherein the transport block satisfies a per-slot transport block size threshold that is associated with an HARQ processing timeline; and processing at least a portion of the transport block or at least a portion of the multiple transport blocks during one or more time intervals that occur after the downlink slot.

Aspect 2: The method of aspect 1, further comprising: receiving, from the network entity, a control message configuring the UE with the TDD slot configuration, wherein processing the at least a portion of the transport block or the at least a portion of the multiple transport blocks during the one or more time intervals is based at least in part on a mapping between the downlink slot and the one or more time intervals, the mapping being associated with the TDD slot configuration.

Aspect 3: The method of any of aspects 1 through 2, further comprising: receiving, from the network entity, information indicating the one or more time intervals for processing the at least a portion of the transport block or the at least a portion of the multiple transport blocks.

Aspect 4: The method of aspect 3, wherein the information is received via a DCI message, an RRC message, a medium access control control element (MAC-CE), or a combination thereof.

Aspect 5: The method of any of aspects 1 through 4, further comprising: determining that the processing of the at least a portion of the transport block or the at least a portion of the multiple transport blocks during the one or more time intervals is allowed for the downlink slot based at least in part on the one or more non-downlink slots comprising flexible slots.

Aspect 6: The method of aspect 5, further comprising: receiving a control message comprising an indication of one or more slots for which the processing of the at least a portion of the transport block or the at least a portion of the multiple transport blocks during the one or more time intervals is allowed based at least in part on the one or more non-downlink slots comprising the flexible slots, wherein determining that the processing of the at least the portion of the multiple transport blocks during the one or more time intervals is allowed for the downlink slot is in accordance with the indication.

Aspect 7: The method of aspect 6, wherein the control message comprises a DCI message or an RRC message.

Aspect 8: The method of any of aspects 1 through 7, further comprising: transmitting a capability message indicating a capability of the UE to process the at least a portion of the transport block or the at least a portion of the multiple transport blocks during the one or more time intervals, wherein the processing is based at least in part on the capability of the UE.

Aspect 9: The method of any of aspects 1 through 8, further comprising: determining that a quantity of the multiple transport blocks satisfies a threshold, wherein processing the at least a portion of the multiple transport blocks is based at least in part on a timeline that is extended in response to the quantity of the multiple transport blocks satisfying the threshold.

Aspect 10: The method of any of aspects 1 through 8, further comprising: determining that a size of the transport block satisfies the threshold, wherein processing the at least the portion of the transport block is based at least in part on a timeline that is extended in response to the size of the transport block satisfying the threshold.

Aspect 11: The method of any of aspects 1 through 9, further comprising: determining that a processed quantity of the multiple transport blocks satisfies a processing threshold; and dropping at least one of the multiple transport blocks in response to the processed quantity of the multiple transport blocks satisfying the processing threshold.

Aspect 12: The method of any of aspects 1 through 11, further comprising: receiving downlink data between the downlink slot and the one or more time intervals; and sending an asynchronous HARQ message in response to the downlink data.

Aspect 13: The method of any of aspects 1 through 9, 11, and 12, wherein receiving the multiple transport blocks comprises: receiving the multiple transport blocks in the downlink slot as part of a MIMO transmission, wherein processing the at least a portion of the multiple transport blocks during the one or more time intervals is based at least in part on the MIMO transmission in the downlink slot having a greater quantity of layers than a second MIMO transmission in a second downlink slot before the downlink slot.

Aspect 14: The method of any of aspects 1 through 8, 10, and 12, wherein receiving the transport block comprises: receiving the transport block in the downlink slot as part of a MIMO transmission, wherein processing the at least a portion of the transport block during the one or more time intervals is based at least in part on a size of the transport block for a quantity of layers of the MIMO transmission exceeding a capability of the UE associated with the HARQ processing timeline.

Aspect 15: The method of any of aspects 1 through 9 and 11 through 13, wherein receiving the multiple transport blocks comprises: receiving the multiple transport blocks in the downlink slot as part of a carrier aggregation (CA) transmission, a multiple transmission and reception point (mTRP) transmission, an ultra-reliable and low-latency communications (URLLC) transmission, or a combination thereof, wherein processing the at least a portion of the multiple transport blocks during the one or more time intervals is based at least in part on the CA transmission, the mTRP transmission, the URLLC transmission, or a combination thereof.

Aspect 16: The method of any of aspects 1 through 9, 11 through 13, and 15, wherein receiving the multiple transport blocks in the downlink slot comprises: receiving the multiple transport blocks in the downlink slot as part of a code block group (CBG)-based HARQ retransmission, wherein processing the at least a portion of the multiple transport blocks during the one or more time intervals is based at least in part on the CBG-based HARQ retransmission.

Aspect 17: The method of any of aspects 1 through 16, wherein the one or more time intervals at least partially overlap in a time domain with the one or more non-downlink slots.

Aspect 18: The method of aspect 17, wherein the one or more non-downlink slots comprise one or more uplink slots, special slots, flexible slots, or a combination thereof.

Aspect 19: The method of any of aspects 1 through 9, 11 through 13, and 15 through 18, wherein processing the at least a portion of the multiple transport blocks comprises: processing the at least a portion of the multiple transport blocks in an order based at least in part on an index of the multiple transport blocks in the downlink slot immediately preceding the one or more non-downlink slots.

Aspect 20: The method of any of aspects 1 through 19, wherein the one or more time intervals correspond to one or more sub-slots of the non-downlink slots.

Aspect 21: A method for wireless communications at a network entity, comprising: transmitting, to a UE, a message for configuring the UE to process at least a portion of data corresponding to a downlink slot after the downlink slot and during one or more time intervals; transmitting, to the UE, a message scheduling a transport block or multiple transport blocks in a downlink slot that immediately precedes one or more non-downlink slots in a time division-duplexing slot configuration; and transmitting the transport block or the multiple transport blocks in the downlink slot, wherein the transport block satisfies a per-slot transport block size threshold that is associated with an HARQ processing timeline.

Aspect 22: The method of aspect 21, further comprising: transmitting, to the UE, a control message configuring the UE with a TDD slot configuration, wherein configuring the UE to process the at least a portion of the data during the one or more time intervals is based at least in part on a mapping between the downlink slot and the one or more time intervals, the mapping being associated with the TDD slot configuration.

Aspect 23: The method of any of aspects 21 through 22, further comprising: transmitting, to the UE, information indicating the one or more time intervals for processing the at least a portion of the transport block or the at least a portion of the multiple transport blocks.

Aspect 24: The method of aspect 23, wherein the information is transmitted via a DCI message, an RRC message, a medium access control control element (MAC-CE), or a combination thereof.

Aspect 25: The method of any of aspects 21 through 24, further comprising: determining that the processing of the at least a portion of the transport block or the at least a portion of the multiple transport blocks during the one or more time intervals is allowed for the downlink slot based at least in part on the one or more non-downlink slots comprising flexible slots.

Aspect 26: The method of aspect 25, further comprising: transmitting a control message comprising an indication of one or more slots for which the processing of the at least a portion of the transport block or the at least a portion of the multiple transport blocks during the one or more time intervals is allowed based at least in part on the one or more non-downlink slots comprising the flexible slots, wherein determining that the processing of the at least the portion of the multiple transport blocks during the one or more time intervals is allowed for the downlink slot is in accordance with the indication.

Aspect 27: The method of aspect 26, wherein the control message comprises a DCI message or an RRC message.

Aspect 28: The method of any of aspects 21 through 27, further comprising: receiving a capability message indicating a capability of the UE to process the at least a portion of the transport block or the at least a portion of the multiple transport blocks during the one or more time intervals, wherein configuring the UE is based at least in part on the capability of the UE.

Aspect 29: The method of any of aspects 21 through 28, further comprising: determining that a quantity of the multiple transport blocks satisfies a threshold, wherein configuring the UE to process the at least a portion of the multiple transport blocks is based at least in part on a timeline that is extended in response to the quantity of the multiple transport blocks satisfying the threshold.

Aspect 30: The method of any of aspects 21 through 28, further comprising: determining that a size of the transport block satisfies the threshold, wherein configuring the UE to process the at least the portion of the transport block is based at least in part on a timeline that is extended in response to the size of the transport block satisfying the threshold.

Aspect 31: The method of any of aspects 21 through 30, further comprising: transmitting downlink data between the downlink slot and the one or more time intervals; and receiving an asynchronous HARQ message in response to the downlink data.

Aspect 32: The method of any of aspects 21 through 29 and 31, wherein transmitting the multiple transport blocks comprises: transmitting the multiple transport blocks in the downlink slot as part of a MIMO transmission, wherein the MIMO transmission in the downlink slot has a greater quantity of layers than a second MIMO transmission in a second downlink slot before the downlink slot.

Aspect 33: The method of any of aspects 21 through 28, 30, and 31, wherein transmitting the transport block comprises: transmitting the transport block in the downlink slot as part of a MIMO transmission, wherein a size of the transport block for a quantity of layers of the MIMO transmission exceeds a capability of the UE associated with the HARQ processing timeline.

Aspect 34: The method of any of aspects 21 through 29, 31, and 32, wherein transmitting the multiple transport blocks comprises: transmitting the multiple transport blocks in the downlink slot as part of a carrier aggregation (CA) transmission, a multiple transmission and reception point (mTRP) transmission, an ultra-reliable and low-latency communications (URLLC) transmission, or a combination thereof.

Aspect 35: The method of any of aspects 21 through 29, 31, 32, and 34, wherein transmitting the multiple transport blocks in the downlink slot comprises: transmitting the multiple transport blocks in the downlink slot as part of a code block group (CBG)-based HARQ retransmission.

Aspect 36: The method of any of aspects 21 through 35, wherein the one or more time intervals at least partially overlap in a time domain with the one or more non-downlink slots.

Aspect 37: The method of any of aspects 21 through 36, wherein the one or more non-downlink slots comprise one or more uplink slots, special slots, flexible slots, or a combination thereof.

Aspect 38: The method of any of aspects 21 through 37, wherein the one or more time intervals correspond to one or more sub-slots of the non-downlink slots.

Aspect 39: A UE for wireless communications, comprising one or more memories storing processor-executable code, and one or more processors coupled with the one or more memories and individually or collectively operable to execute the code to cause the UE to perform a method of any of aspects 1 through 20.

Aspect 40: A UE for wireless communications, comprising at least one means for performing a method of any of aspects 1 through 20.

Aspect 41: A non-transitory computer-readable medium storing code for wireless communications, the code comprising instructions executable by one or more processors to perform a method of any of aspects 1 through 20.

Aspect 42: A network entity for wireless communications, comprising one or more memories storing processor-executable code, and one or more processors coupled with the one or more memories and individually or collectively operable to execute the code to cause the network entity to perform a method of any of aspects 21 through 38.

Aspect 43: A network entity for wireless communications, comprising at least one means for performing a method of any of aspects 21 through 38.

Aspect 44: A non-transitory computer-readable medium storing code for wireless communications, the code comprising instructions executable by one or more processors to perform a method of any of aspects 21 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
   one or more memories storing processor-executable code; and
   one or more processors coupled with the one or more memories and individually or collectively operable to execute the code to cause the UE to:
   receive, from a network entity, a message scheduling a transport block or multiple transport blocks in a downlink slot that immediately precedes one or more non-downlink slots in a time-division duplexing slot configuration;
   receive the transport block or the multiple transport blocks in the downlink slot, wherein the transport block satisfies a per-slot transport block size threshold that is associated with a hybrid automatic repeat request (HARQ) processing timeline;
   determine that processing of at least a portion of the transport block or at least a portion of the multiple transport blocks during one or more time intervals is allowed for the downlink slot based at least in part on the one or more non-downlink slots comprising flexible slots; and
   process the at least a portion of the transport block or the at least a portion of the multiple transport blocks during one or more time intervals that occur after the downlink slot.

2. The UE of claim 1, wherein the one or more processors are individually or collectively further operable to execute the code to cause the UE to:
   receive, from the network entity, a control message configuring the UE with the time-division duplexing slot configuration, wherein processing the at least a portion of the transport block or the at least a portion of the multiple transport blocks during the one or more time intervals is based at least in part on a mapping between the downlink slot and the one or more time intervals, the mapping being associated with the time-division duplexing slot configuration.

3. The UE of claim 1, wherein the one or more processors are individually or collectively further operable to execute the code to cause the UE to:

receive, from the network entity, information indicating the one or more time intervals for processing the at least a portion of the transport block or the at least a portion of the multiple transport blocks.

4. The UE of claim 3, wherein the information is received via a downlink control information (DCI) message, a radio resource control (RRC) message, a medium access control control element (MAC-CE), or a combination thereof.

5. The UE of claim 1, wherein the one or more processors are individually or collectively further operable to execute the code to cause the UE to:

receive a control message comprising an indication of one or more slots for which the processing of the at least a portion of the transport block or the at least a portion of the multiple transport blocks during the one or more time intervals is allowed based at least in part on the one or more non-downlink slots comprising the flexible slots, wherein determining that the processing of the at least the portion of the multiple transport blocks during the one or more time intervals is allowed for the downlink slot is in accordance with the indication.

6. The UE of claim 5, wherein the control message comprises a downlink control information (DCI) message or a radio resource control (RRC) message.

7. The UE of claim 1, wherein the one or more processors are individually or collectively further operable to execute the code to cause the UE to:

transmit a capability message indicating a capability of the UE to process the at least a portion of the transport block or the at least a portion of the multiple transport blocks during the one or more time intervals, wherein the processing is based at least in part on the capability of the UE.

8. The UE of claim 1, wherein the one or more processors are individually or collectively further operable to execute the code to cause the UE to:

determine that a quantity of the multiple transport blocks satisfies a threshold, wherein processing the at least a portion of the multiple transport blocks is based at least in part on a timeline that is extended in response to the quantity of the multiple transport blocks satisfying the threshold.

9. The UE of claim 1, wherein the one or more processors are individually or collectively further operable to execute the code to cause the UE to:

determine that a size of the transport block satisfies the threshold, wherein processing the at least the portion of the transport block is based at least in part on a timeline that is extended in response to the size of the transport block satisfying the threshold.

10. The UE of claim 1, wherein the one or more processors are individually or collectively further operable to execute the code to cause the UE to:

determine that a processed quantity of the multiple transport blocks satisfies a processing threshold; and drop at least one of the multiple transport blocks in response to the processed quantity of the multiple transport blocks satisfying the processing threshold.

11. The UE of claim 1, wherein the one or more processors are individually or collectively further operable to execute the code to cause the UE to:

receive downlink data between the downlink slot and the one or more time intervals; and send an asynchronous HARQ message in response to the downlink data.

12. The UE of claim 1, wherein, to receive the multiple transport blocks, the one or more processors are individually or collectively operable to execute the code to cause the UE to:

receive the multiple transport blocks in the downlink slot as part of a multiple-input multiple-output (MIMO) transmission, wherein processing the at least a portion of the multiple transport blocks during the one or more time intervals is based at least in part on the MIMO transmission in the downlink slot having a greater quantity of layers than a second MIMO transmission in a second downlink slot before the downlink slot.

13. The UE of claim 1, wherein, to receive the transport block, the one or more processors are individually or collectively operable to execute the code to cause the UE to:

receive the transport block in the downlink slot as part of a multiple-input multiple-output (MIMO) transmission, wherein processing the at least a portion of the transport block during the one or more time intervals is based at least in part on a size of the transport block for a quantity of layers of the MIMO transmission exceeding a capability of the UE associated with the HARQ processing timeline.

14. The UE of claim 1, wherein, to receive the multiple transport blocks, the one or more processors are individually or collectively operable to execute the code to cause the UE to:

receive the multiple transport blocks in the downlink slot as part of a carrier aggregation (CA) transmission, a multiple transmission and reception point (mTRP) transmission, an ultra-reliable and low-latency communications (URLLC) transmission, or a combination thereof, wherein processing the at least a portion of the multiple transport blocks during the one or more time intervals is based at least in part on the CA transmission, the mTRP transmission, the URLLC transmission, or a combination thereof.

15. The UE of claim 1, wherein, to receive the multiple transport blocks in the downlink slot, the one or more processors are individually or collectively operable to execute the code to cause the UE to:

receive the multiple transport blocks in the downlink slot as part of a code block group (CBG)-based hybrid automatic repeat request (HARQ) retransmission, wherein processing the at least a portion of the multiple transport blocks during the one or more time intervals is based at least in part on the CBG-based HARQ retransmission.

16. The UE of claim 1, wherein the one or more time intervals at least partially overlap in a time domain with the one or more non-downlink slots.

17. The UE of claim 16, wherein the one or more non-downlink slots comprise one or more uplink slots, special slots, flexible slots, or a combination thereof.

18. The UE of claim 1, wherein, to process the at least a portion of the multiple transport blocks, the one or more processors are individually or collectively operable to execute the code to cause the UE to:

process the at least a portion of the multiple transport blocks in an order based at least in part on an index of the multiple transport blocks in the downlink slot immediately preceding the one or more non-downlink slots.

19. The UE of claim 1, wherein the one or more time intervals correspond to one or more sub-slots of the non-downlink slots.

20. A network entity for wireless communications, comprising:

one or more memories storing processor-executable code; and one or more processors coupled with the one or more memories and individually or collectively operable to execute the code to cause the network entity to:

determine that processing of at least a portion of a transport block or at least a portion of multiple transport blocks during one or more time intervals is allowed for a downlink slot based at least in part on one or more non-downlink slots comprising flexible slots;

transmit, to a user equipment (UE), a message for configuring the UE to process at least a portion of data corresponding to the downlink slot after the downlink slot and during one or more time intervals;

transmit, to the UE, a message scheduling a transport block or multiple transport blocks in a downlink slot that immediately precedes one or more non-downlink slots in a time division-duplexing slot configuration; and transmit the transport block or the multiple transport blocks in the downlink slot, wherein the transport block satisfies a per-slot transport block size threshold that is associated with a hybrid automatic repeat request (HARQ) processing timeline.

21. The network entity of claim 20, wherein the one or more processors are individually or collectively further operable to execute the code to cause the network entity to:

transmit, to the UE, a control message configuring the UE with a time-division duplexing slot configuration, wherein configuring the UE to process the at least a portion of the data during the one or more time intervals is based at least in part on a mapping between the downlink slot and the one or more time intervals, the mapping being associated with the time-division duplexing slot configuration.

22. The network entity of claim 20, wherein the one or more processors are individually or collectively further operable to execute the code to cause the network entity to:

transmit, to the UE, information indicating the one or more time intervals for processing the at least a portion of the transport block or the at least a portion of the multiple transport blocks.

23. The network entity of claim 22, wherein the information is transmitted via a downlink control information (DCI) message, a radio resource control (RRC) message, a medium access control control element (MAC-CE), or a combination thereof.

24. The network entity of claim 20, wherein the one or more processors are individually or collectively further operable to execute the code to cause the network entity to:

transmit a control message comprising an indication of one or more slots for which the processing of the at least a portion of the transport block or the at least a portion of the multiple transport blocks during the one or more time intervals is allowed based at least in part on the one or more non-downlink slots comprising the flexible slots, wherein determining that the processing of the at least the portion of the multiple transport blocks during the one or more time intervals is allowed for the downlink slot is in accordance with the indication.

25. The network entity of claim 20, wherein the one or more processors are individually or collectively further operable to execute the code to cause the network entity to:

receive a capability message indicating a capability of the UE to process the at least a portion of the transport block or the at least a portion of the multiple transport blocks during the one or more time intervals, wherein configuring the UE is based at least in part on the capability of the UE.

26. The network entity of claim 20, wherein the one or more processors are individually or collectively further operable to execute the code to cause the network entity to:

determine that a quantity of the multiple transport blocks satisfies a threshold, wherein configuring the UE to process the at least a portion of the multiple transport blocks is based at least in part on a timeline that is extended in response to the quantity of the multiple transport blocks satisfying the threshold.

27. A method for wireless communications at a user equipment (UE), comprising:

receiving, from a network entity, a message scheduling a transport block or multiple transport blocks in a downlink slot that immediately precedes one or more non-downlink slots in a time-division duplexing slot configuration;

receiving the transport block or the multiple transport blocks in the downlink slot, wherein the transport block satisfies a per-slot transport block size threshold that is associated with a hybrid automatic repeat request (HARQ) processing timeline;

determining that processing of at least a portion of the transport block or at least a portion of the multiple transport blocks during one or more time intervals is allowed for the downlink slot based at least in part on the one or more non-downlink slots comprising flexible slots; and processing the at least a portion of the transport block or the at least a portion of the multiple transport blocks during one or more time intervals that occur after the downlink slot.

28. A method for wireless communications, comprising:

determining that processing of at least a portion of a transport block or at least a portion of multiple transport blocks during one or more time intervals is allowed for a downlink slot based at least in part on one or more non-downlink slots comprising flexible slots;

transmitting, to a user equipment (UE), a message for configuring the UE to process at least a portion of data corresponding to the downlink slot after the downlink slot and during one or more time intervals;

transmitting, to a user equipment (UE), a message scheduling a transport block or multiple transport blocks in a downlink slot that immediately precedes one or more non-downlink slots in a time division-duplexing slot configuration; and transmitting the transport block or the multiple transport blocks in the downlink slot, wherein the transport block satisfies a per-slot transport block size threshold that is associated with a hybrid automatic repeat request (HARQ) processing timeline.

\* \* \* \* \*